United States Patent
Ohta et al.

(10) Patent No.: US 11,490,372 B2
(45) Date of Patent: Nov. 1, 2022

(54) WIRELESS TERMINAL, WIRELESS BASE STATION, WIRELESS COMMUNICATION SYSTEM, AND WIRELESS COMMUNICATION METHOD

(71) Applicant: FUJITSU LIMITED, Kawasaki (JP)

(72) Inventors: Yoshiaki Ohta, Yokohama (JP);
Yoshihiro Kawasaki, Kawasaki (JP);
Takayoshi Ode, Yokohama (JP);
Masatsugu Shimizu, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 106 days.

(21) Appl. No.: 16/579,237

(22) Filed: Sep. 23, 2019

(65) Prior Publication Data
US 2020/0022134 A1    Jan. 16, 2020

Related U.S. Application Data

(63) Continuation of application No. PCT/JP2017/017104, filed on Apr. 28, 2017.

(51) Int. Cl.
*H04W 4/00* (2018.01)
*H04W 72/04* (2009.01)

(52) U.S. Cl.
CPC ..... *H04W 72/0413* (2013.01); *H04W 72/042* (2013.01); *H04W 72/048* (2013.01)

(58) Field of Classification Search
CPC ... H04W 72/04; H04W 72/042; H04W 72/02; H04W 72/0413; H04W 72/14
See application file for complete search history.

(56) References Cited

U.S. PATENT DOCUMENTS

| 2013/0016615 A1 | 1/2013 | Shi et al. |
| 2013/0242726 A1 | 9/2013 | Zhu et al. |
| 2013/0343293 A1 | 12/2013 | Jersenius et al. |

(Continued)

FOREIGN PATENT DOCUMENTS

| CN | 102905305 B | * | 7/2015 |
| JP | 2013-534759 A | | 9/2013 |

(Continued)

OTHER PUBLICATIONS

3GPP TS 36.211 V14.2.0, Technical Specification; Mar. 2017; 3rd Generation Partnership Project; Technical Specification Group Radio Access Network; Evolved Universal Terrestrial Radio Access (E-UTRA); Physical channels and modulation (Release 14).

(Continued)

*Primary Examiner* — Omoniyi Obayanju
(74) *Attorney, Agent, or Firm* — Myers Wolin, LLC

(57) ABSTRACT

A wireless terminal of a wireless communication system, the wireless communication system including a wireless base station and one or more wireless terminals, the wireless terminal includes: a radio communication circuit configured to perform wireless communication with the wireless base station; and a controller configured to allocate a part of an allocation amount of a wireless resource indicated in uplink grant to transmission of a status report of a transmission buffer when the uplink grant is received from the wireless base station, and uplink data stored in the transmission buffer is transmitted by using the radio communication circuit.

13 Claims, 17 Drawing Sheets

(56) References Cited

U.S. PATENT DOCUMENTS

| | | | |
|---|---|---|---|
| 2015/0117342 A1* | 4/2015 | Loehr | H04W 72/1284 |
| | | | 370/329 |
| 2017/0078890 A1* | 3/2017 | Zhu | H04W 16/14 |
| 2017/0257883 A1 | 9/2017 | Bessho | |
| 2018/0077601 A1* | 3/2018 | Kim | H04W 74/006 |
| 2019/0110224 A1* | 4/2019 | Yasukawa | H04W 72/14 |
| 2019/0124571 A1* | 4/2019 | Kong | H04W 36/02 |

FOREIGN PATENT DOCUMENTS

| | | | |
|---|---|---|---|
| JP | 2015-213282 A | 11/2015 | |
| JP | 2016-042726 A | 3/2016 | |
| WO | 2016/035325 A1 | 3/2016 | |

OTHER PUBLICATIONS

3GPP TS 36.212 V14.2.0, Technical Specification; Mar. 2017; 3rd Generation Partnership Project; Technical Specification Group Radio Access Network; Evolved Universal Terrestrial Radio Access (E-UTRA); Multiplexing and channel coding (Release 14).

3GPP TS 36.213 V14.2.0, Technical Specification; Mar. 2017; 3rd Generation Partnership Project; Technical Specification Group Radio Access Network; Evolved Universal Terrestrial Radio Access (E-UTRA); Physical layer procedures (Release 14).

3GPP TS 36.300 V14.2.0, Technical Specification; Mar. 2017; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).

3GPP TS 36.321 V14.2.0, Technical Specification; Mar. 2017; 3rd Generation Partnership Project; Technical Specification Group Radio Access Network; Evolved Universal Terrestrial Radio Access (E-UTRA); Medium Access Control (MAC) protocol specification (Release 14).

3GPP TS 36.322 V14.0.0, Technical Specification; Mar. 2017; 3rd Generation Partnership Project; Technical Specification Group Radio Access Network; Evolved Universal Terrestrial Radio Access (E-UTRA); Radio Link Control (RLC) protocol specification Release 14).

3GPP TS 36.323 V14.2.0, Technical Specification; Mar. 2017; 3rd Generation Partnership Project; Technical Specification Group Radio Access Network; Evolved Universal Terrestrial Radio Access (E-UTRA); Packet Data Convergence Protocol (PDCP) specification (Release 14).

3GPP TS 36.331 V14.2.0, Technical Specification; Mar. 2017; 3rd Generation Partnership Project; Technical Specification Group Radio Access Network; Evolved Universal Terrestrial Radio Access (E-UTRA); Radio Resource Control (RRC); Protocol specification (Release 14).

3GPP TS 36.413 V14.2.0, Technical Specification; Mar. 2017; 3rd Generation Partnership Project; Technical Specification Group Radio Access Network; Evolved Universal Terrestrial Radio Access Network (E-UTRAN); S1 Application Protocol (S1AP) (Release 14).

3GPP TS 36.423 V14.2.0, Technical Specification; Mar. 2017; 3rd Generation Partnership Project; Technical Specification Group Radio Access Network; Evolved Universal Terrestrial Radio Access Network (E-UTRAN); X2 application protocol (X2AP) (Release 14).

3GPP TS 36.425 V14.0.0, Technical Specification; Mar. 2017; 3rd Generation Partnership Project; Technical Specification Group Radio Access Network; Evolved Universal Terrestrial Radio Access Network (E-UTRAN); X2 interface user plane protocol (Release 14).

3GPP TR 38.801 V14.0.0, Technical Report; Mar. 2017; 3rd Generation Partnership Project; Technical Specification Group Radio Access Network; Study on new radio access technology: Radio access architecture and interfaces (Release 14).

3GPP TR 38.802 V14.0.0, Technical Report; Mar. 2017; 3rd Generation Partnership Project; Technical Specification Group Radio Access Network; Study on New Radio Access Technology Physical Layer Aspects (Release 14).

3GPP TR 38.803 V14.0.0, Technical Report; Mar. 2017; 3rd Generation Partnership Project; Technical Specification Group Radio Access Network; Study on New Radio Access Technology; RF and co-existence aspects (Release 14).

3GPP TR 38.804 V14.0.0, Technical Report; Mar. 2017; 3rd Generation Partnership Project; Technical Specification Group Radio Access Network; Study on New Radio Access Technology; Radio Interface Protocol Aspects (Release 14).

3GPP TR 38.900 V14.2.0, Technical Report; Dec. 2016; 3rd Generation Partnership Project; Technical Specification Group Radio Access Network; Study on channel model for frequency spectrum above 6 GHz (Release 14).

3GPP TR 38.912 V14.0.0, Technical Specification; Mar. 2017; 3rd Generation Partnership Project;Technical Specification Group Radio Access Network; Study on New Radio (NR) access technology (Release 14).

3GPP TR 38.913 V14.2.0, Technical Report; Mar. 2017; 3rd Generation Partnership Project; Technical Specification Group Radio Access Network; Study on Scenarios and Requirements for Next Generation Access Technologies (Release 14).

International Search Report and Written Opinion issue for corresponding International Patent Application No. PCT/JP2017/017104, with English translation attached.

Ericsson, "Uplink Dynamic Scheduling in NR", 3GPP TSG-RAN WG2#95bis, R2-166799, pp. 1-4, Sep. 2016 [retrieved on Jul. 4, 2017], Retrieved from the Internet: URL:http://www.3gpp.org/ftp/tsg_ran/WG2_RL2/TSGR2_95bis/Docs/R2-166799.zip (Cited in ISR for PCT/JP2017/017104).

Notice of Reasons for Refusal issued by the Japan Patent Office for corresponding Japanese Patent Application No. 2019-515076, dated Mar. 2, 2021 with an English machine translation.

\* cited by examiner

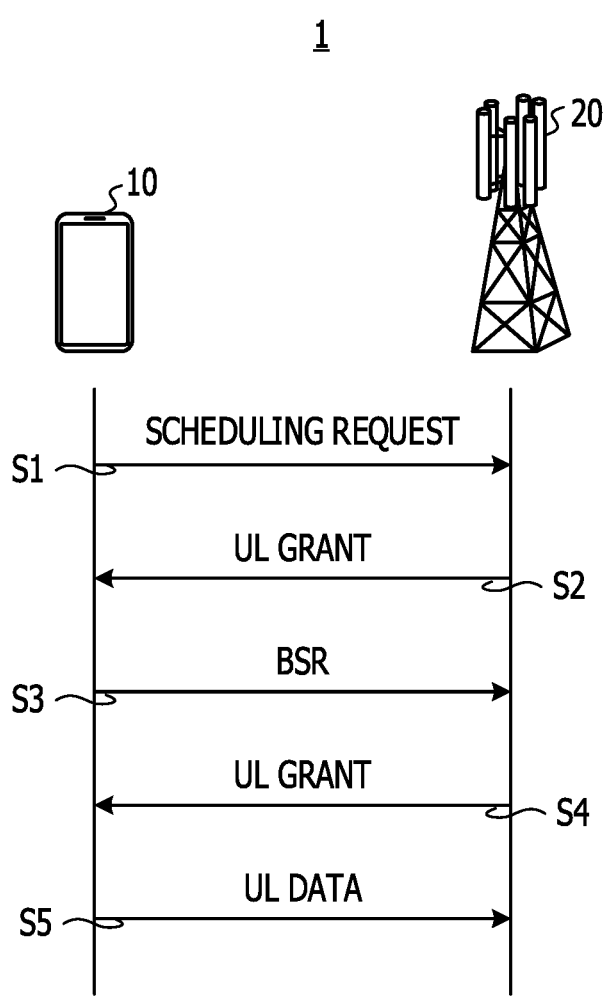

FIG. 2

| INDEX | BUFFER SIZE (BS) VALUE [bytes] | INDEX | BUFFER SIZE (BS) VALUE [bytes] |
|---|---|---|---|
| 0 | BS = 0 | 32 | 4940 < BS <= 6074 |
| 1 | 0 < BS <= 10 | 33 | 6074 < BS <= 7469 |
| 2 | 10 < BS <= 13 | 34 | 7469 < BS <= 9185 |
| 3 | 13 < BS <= 16 | 35 | 9185 < BS <= 11294 |
| 4 | 16 < BS <= 19 | 36 | 11294 < BS <= 13888 |
| 5 | 19 < BS <= 23 | 37 | 13888 < BS <= 17077 |
| 6 | 23 < BS <= 29 | 38 | 17077 < BS <= 20999 |
| 7 | 29 < BS <= 35 | 39 | 20999 < BS <= 25822 |
| 8 | 35 < BS <= 43 | 40 | 25822 < BS <= 31752 |
| 9 | 43 < BS <= 53 | 41 | 31752 < BS <= 39045 |
| 10 | 53 < BS <= 65 | 42 | 39045 < BS <= 48012 |
| 11 | 65 < BS <= 80 | 43 | 48012 < BS <= 59039 |
| 12 | 80 < BS <= 98 | 44 | 59039 < BS <= 72598 |
| 13 | 98 < BS <= 120 | 45 | 72598 < BS <= 89272 |
| 14 | 120 < BS <= 147 | 46 | 89272 < BS <= 109774 |
| 15 | 147 < BS <= 181 | 47 | 109774 < BS <= 134986 |
| 16 | 181 < BS <= 223 | 48 | 134986 < BS <= 165989 |
| 17 | 223 < BS <= 274 | 49 | 165989 < BS <= 204111 |
| 18 | 274 < BS <= 337 | 50 | 204111 < BS <= 250990 |
| 19 | 337 < BS <= 414 | 51 | 250990 < BS <= 308634 |
| 20 | 414 < BS <= 509 | 52 | 308634 < BS <= 379519 |
| 21 | 509 < BS <= 625 | 53 | 379519 < BS <= 466683 |
| 22 | 625 < BS <= 769 | 54 | 466683 < BS <= 573866 |
| 23 | 769 < BS <= 945 | 55 | 573866 < BS <= 705666 |
| 24 | 945 < BS <= 1162 | 56 | 705666 < BS <= 867737 |
| 25 | 1162 < BS <= 1429 | 57 | 867737 < BS <= 1067031 |
| 26 | 1429 < BS <= 1757 | 58 | 1067031 < BS <= 1312097 |
| 27 | 1757 < BS <= 2161 | 59 | 1312097 < BS <= 1613447 |
| 28 | 2161 < BS <= 2657 | 60 | 1613447 < BS <= 1984009 |
| 29 | 2657 < BS <= 3267 | 61 | 1984009 < BS <= 2439678 |
| 30 | 3267 < BS <= 4017 | 62 | 2439678 < BS <= 3000000 |
| 31 | 4017 < BS <= 4940 | 63 | BS > 3000000 |

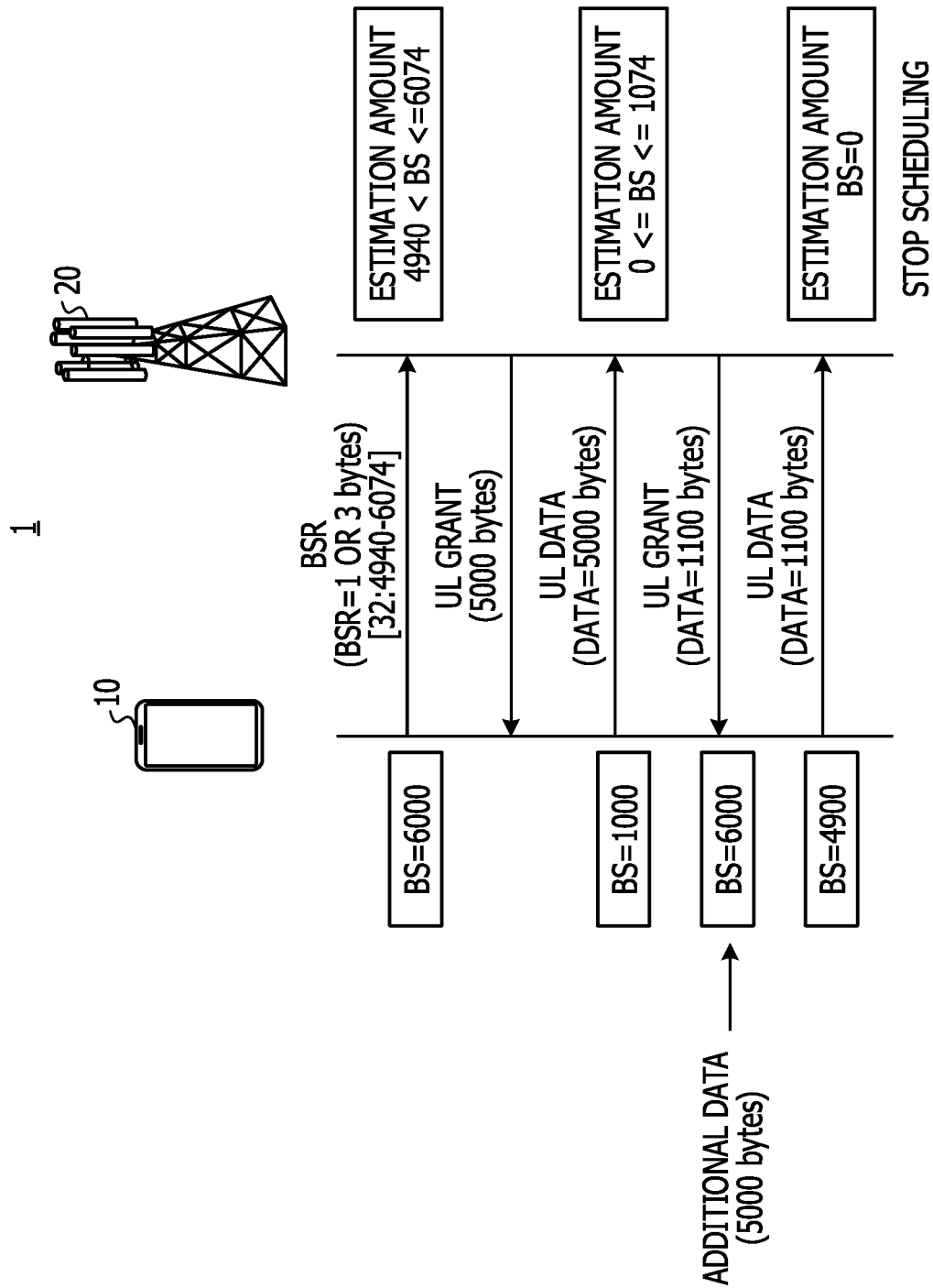

WIRELESS TERMINAL, WIRELESS BASE STATION, WIRELESS COMMUNICATION SYSTEM, AND WIRELESS COMMUNICATION METHOD

CROSS-REFERENCE TO RELATED APPLICATION

This application is a continuation application of International Application PCT/JP2017/017104 filed on Apr. 28, 2017 and designated the U.S., the entire contents of which are incorporated herein by reference.

FIELD

The embodiments discussed herein are related to a wireless terminal, a wireless base station, a wireless communication system, and a wireless communication method.

BACKGROUND

In recent years, in a wireless communication system (also referred to as a mobile communication system) such as a mobile phone system (cellular system), a next generation wireless communication technique for achieving higher speed and larger capacity of wireless communication has been discussed. For example, the 3rd Generation Partnership Project (3GPP) that is a standardization organization has already developed a specification for a communication standard called Long Term Evolution (LTE) or a communication standard called LTE-Advanced (LTE-A) based on the wireless communication technique of LTE, and continuously has performed work for expansion of the function thereof. For example, standardization of a fifth generation mobile communication system (also referred to as a 5G system) for realizing operation scenarios or contents of technical requirements presented by International Telecommunication Union Radio communications sector (ITU-R) has been under discussion.

In the wireless communication system, in order to assist a wireless base station (also referred to as a base station) in scheduling a wireless resource with higher efficiency, for example, a wireless terminal (also referred to as a terminal, a user terminal, or a mobile station) transmits uplink (also referred to as UL) scheduling information, for example, a buffer status report (also referred to as a BSR) for the wireless terminal, to the wireless base station. The transmission of a buffer status report for a wireless terminal is also referred to as a BSR, and, for example, information based on an amount of data staying in a transmission buffer of the wireless terminal is transmitted.

From the viewpoint of transmission efficiency of a BSR, the wireless terminal converts an amount of data staying in the transmission buffer (also referred to as a buffer) into an index value (also referred to as a BSR index) quantized on a predetermined granularity, and thus compresses an information amount. Thus, the wireless terminal and the wireless base station are provided with a buffer status report table (also referred to as a BSR index table). In the BSR index table, a range (for example, a range from 0 to 3000 kbytes) from a lower limit value of the transmission buffer to an upper limit value thereof is divided into a plurality of small ranges, and an index of each small range corresponds to a single range of a data amount (also referred to as a buffer size) in the buffer.

The wireless terminal specifies an index value (also referred to as a BSR index, a BSR index value, or a BSR value) associated with a small range corresponding to a data amount (also referred to as a buffer size, data available for transmission, or a data volume) in the buffer according to the BSR index table, and transmits a BSR including the BSR index. The wireless base station receives the BSR from the wireless terminal, may recognize which wireless terminal requires to what extent of wireless resource, and may thus perform appropriate scheduling. The wireless terminal may positively request the wireless base station to allocate a wireless resource.

A trigger to transmit a BSR from the wireless terminal is generated, for example, according to a cycle designated by setting information transmitted from the wireless base station. The wireless base station estimates a buffer size of the wireless terminal based on a BSR from the wireless terminal, and updates the estimated amount of the buffer size of the wireless terminal based on an amount of a wireless resource allocated in scheduling. A trigger to transmit a BSR from the wireless terminal may be generated according to factors other than a cycle designated by setting information transmitted from the wireless base station. For example, when an uplink signal packet is generated, even in a case where a length of padding bits included in the packet is a predetermined length or more, the wireless terminal tries to transmit a BSR to the wireless base station.

Examples of the related art include PTL 1: Japanese Laid-open Patent Publication No. 2016-042726, NPL 1: 3GPP TS 36.211 V14. 2.0 (2017-03), NPL 2: 3GPP TS 36.212 V14. 2.0 (2017-03), NPL 3: 3GPP TS 36.213 V14. 2.0 (2017-03), NPL 4: 3GPP TS 36.300 V14. 2.0 (2017-03), NPL 5: 3GPP TS 36.321 V14. 2.0 (2017-03), NPL 6: 3GPP TS 36.322 V14. 0.0 (2017-03), NPL 7: 3GPP TS 36.323 V14. 2.0 (2017-03), NPL 8: 3GPP TS 36.331 V14. 2.0 (2017-03), NPL 9: 3GPP TS 36.413 V14. 2.0 (2017-03), NPL 10: 3GPP TS 36.423 V14. 2.0 (2017-03), NPL 11: 3GPP TS 36.425 V14. 0.0 (2017-03), NPL 12: 3GPP TR 38.801 V14. 0.0 (2017-03), NPL 13: 3GPP TR 38.802 V14. 0.0 (2017-03), NPL 14: 3GPP TR 38.803 V14. 0.0 (2017-03), NPL 15: 3GPP TR 38.804 V14. 0.0 (2017-03), NPL 16: 3GPP TR 38.900 V14. 2.0 (2016-12), NPL 17: 3GPP TR 38.912 V14. 0.0 (2017-03), and NPL 18: 3GPP TR 38.913 V14. 0.0 (2017-03).

SUMMARY

According to an aspect of the embodiments, provided is a wireless terminal of a wireless communication system, the wireless communication system including a wireless base station and one or more wireless terminals. The wireless terminal includes: a radio communication circuit configured to perform wireless communication with the wireless base station; and a controller configured to allocate a part of an allocation amount of a wireless resource indicated in uplink grant to transmission of a status report of a transmission buffer when the uplink grant is received from the wireless base station, and uplink data stored in the transmission buffer is transmitted by using the radio communication circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating an example of a BSR transmission sequence in a wireless communication system.

FIG. 2 is a diagram illustrating examples of contents of BSR index tables of a terminal and a base station in the wireless communication system.

FIG. 3 is a diagram (first) illustrating a situation that may occur due to deterioration in estimation accuracy of a buffer estimation amount in the base station.

DESCRIPTION OF EMBODIMENTS

Figure 4:
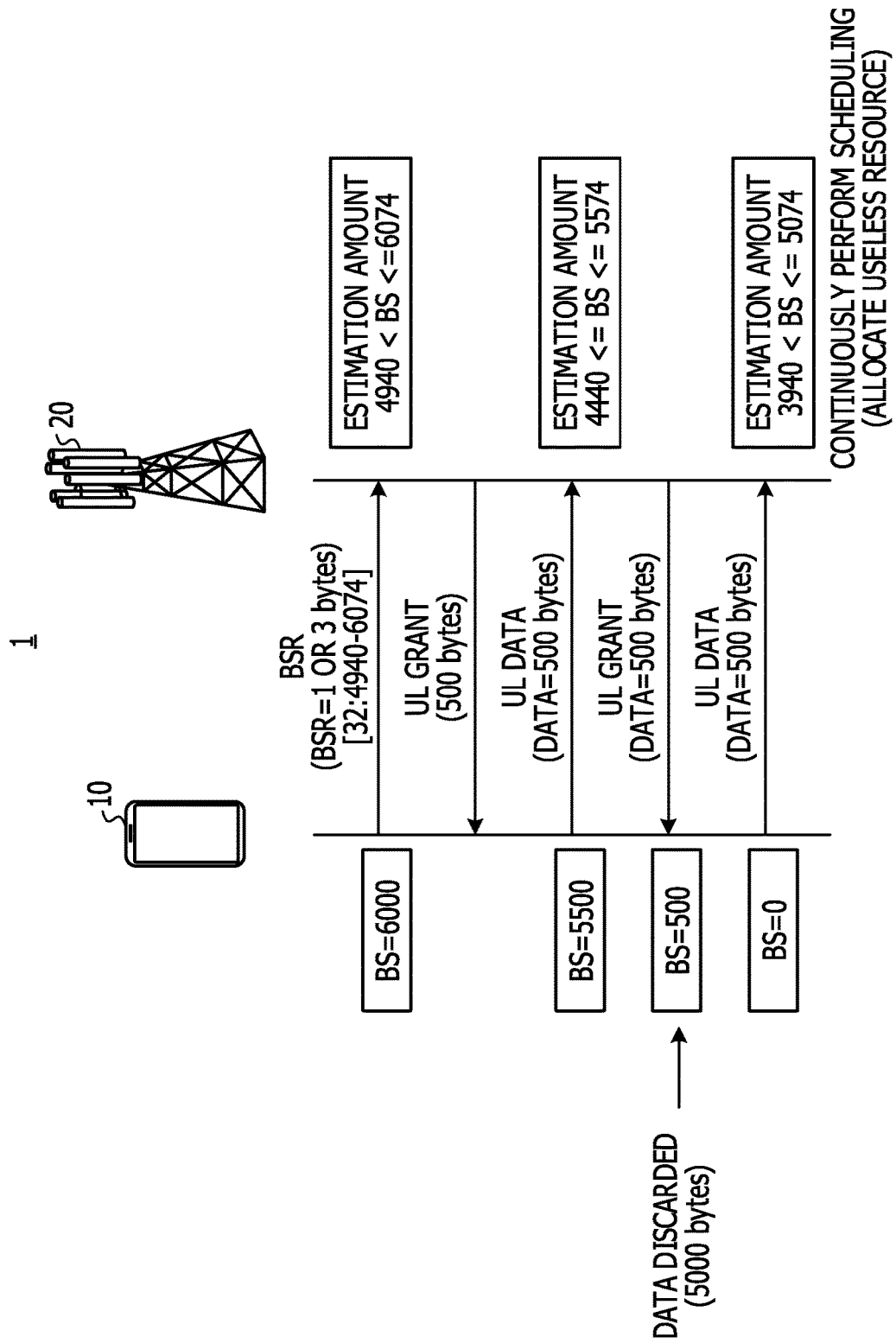
FIG. 4 is a diagram (second) illustrating a situation that may occur due to deterioration in estimation accuracy of a buffer estimation amount in the base station.

In next generation mobile communication systems after the fifth generation mobile communication system, appearance of a service such as tactile communication or augmented reality requiring a low latency in a level that is different from that of the related art is expected. In order to realize such a service, the fifth generation mobile communication system has ultra-reliable and low-latency communications (URLLC) as one of functional requirements. For example, in LTE that is the fourth generation mobile communication system, whereas a latency of 10 milliseconds is supposed as a latency from a transmission source of a packet in a wireless range to a transmission destination, the fifth generation mobile communication system aims to realize a latency of 1 millisecond or less.

However, the discussion in the fifth generation mobile communication system has just started, and, for the time being, basic system design will be mainly discussed. Thus, a technique installed in an operator as appropriate has not been sufficiently examined. For example, the actual situation is that there is not much discussion about installation problems of a BSR in realizing the URLLC.

The disclosed technique has been made in light of the circumstances, and is directed to providing a wireless terminal, a wireless base station, a wireless communication system, and a wireless communication method capable of solving installation problems of a BSR in a fifth generation mobile communication system.

In next generation mobile communication systems after the fifth generation mobile communication system, appearance of a service such as tactile communication or augmented reality requiring a low latency in a level that is different from that of the related art is expected. In order to realize such a service, the fifth generation mobile communication system has ultra-reliable and low-latency communications (URLLC) as one of functional requirements. For example, in LTE that is the fourth generation mobile communication system, whereas a latency of 10-milliseconds is supposed as a latency from a transmission source of a packet in a wireless range to a transmission destination, the fifth generation mobile communication system aims to realize a latency of 1 millisecond or less.

However, the discussion in the fifth generation mobile communication system has just started, and, for the time being, basic system design will be mainly discussed. Thus, a technique installed in an operator as appropriate has not been sufficiently examined. For example, the actual situation is that there is not much discussion about installation problems of a BSR in realizing the URLLC.

The disclosed technique has been made in light of the circumstances, and is directed to providing a wireless terminal, a wireless base station, a wireless communication system, and a wireless communication method capable of solving installation problems of a BSR in a fifth generation mobile communication system.

According to an aspect of the disclosed technique, it is possible to solve installation problems of a BSR in a fifth generation mobile communication system.

The object and advantages of the invention will be realized and attained by means of the elements and combinations particularly pointed out in the claims.

It is to be understood that both the foregoing general description and the following detailed description are exemplary and explanatory and are not restrictive of the invention.

Hereinafter, with reference to the drawings, Examples of a wireless terminal, a wireless base station, a wireless communication system, and a wireless communication method disclosed in the present specification will be described in detail. The Examples described below are not intended to limit the disclosed technique. Needless to say, the respective Examples described below may be combined with each other as appropriate. The entire contents of NPL 1 to 18 are incorporated herein by reference.

As mentioned above, the discussion in the fifth generation mobile communication system has just started. Thus, the actual situation is that there is not much discussion about installation problems of a BSR in realizing the ultra-reliable and low-latency communications (URLLC).

The present inventors have found that, as a result of independent examination on installation difficulties that may occur in realizing a fifth generation mobile communication system, in one aspect of the fifth generation mobile communication system, a data transmission rate is improved more considerably than in the related art, and thus a life cycle of data occurring in a wireless terminal (hereinafter, also referred to as a terminal) may be remarkably accelerated. For example, it may be supposed that data from various devices such as sensors associated with a terminal is frequently generated, and is stored in a transmission buffer. Alternatively, for example, it may be supposed that data is aged due to elapse of a relatively short time, and thus data stored in the transmission buffer is discarded. For example, the time for which the data stays in the transmission buffer of the terminal is longer than a data life cycle, and thus the data in the transmission buffer tends to be discarded without being transmitted to a base station.

As mentioned above, one aspect of the fifth generation mobile communication system, an amount (buffer size) of data stored in a transmission buffer of a terminal may be frequently changed. Thus, there may be the occurrence of a situation that a difference between an estimation amount of a buffer size (also referred to as a buffer estimation amount) of a terminal recognized by a wireless base station (hereinafter, also referred to as a base station) and an actual buffer size of the terminal increases. For example, estimation accuracy of the buffer estimation amount in the base station deteriorates. In a case where a BSR transmission cycle from the terminal is reduced in order to cope with the situation, an overhead of communication due to BSR transmission may increase. For example, there may be the occurrence of a new situation that usage efficiency of a wireless resource deteriorates. In the present disclosure, the term "wireless resource" indicates an uplink wireless resource unless otherwise mentioned.

Next, a description will be made of an example of a BSR transmission sequence. FIG. 1 is a diagram illustrating an example of a BSR transmission sequence in a wireless communication system 1. First, in a case where a trigger to transmit a BSR is generated, a terminal 10 requests a base station 20 to allocate a wireless resource for BSR transmission (S1). A signal transmitted from the terminal 10 to the base station 20 is also referred to as a scheduling request. A trigger to transmit a BSR may be generated at various timings. As described above, the BSR transmission sequence may be executed based on a transmission cycle designated by setting information from the base station 20. Alternatively, in a case where a predetermined event is not detected within a predetermined time with a certain time point as a start point, the BSR transmission sequence may be executed.

The base station 20 receives the request (scheduling request) from the terminal 10, checks whether or not there is an allocable wireless resource, and allocates the wireless resource to the terminal 10 that is a transmission source of the scheduling request when other terminals to which the wireless resource is preferentially allocated are not present. The base station 20 issues uplink grant (also referred to as UL grant, UL scheduling grant) to the terminal 10 (S2). The base station 20 may or not issue uplink grant.

The terminal 10 receives the uplink grant from the base station 20, and then transmits the latest BSR to the base station 20 by using the allocated uplink wireless resource (S3). In this case, the terminal apparatus 10 acquires an amount (buffer size) of data stored in a transmission buffer, and determines an index value (BSR index) of a small range corresponding to the buffer size according to the BSR index table. Consequently, the terminal 10 may transmit a BSR (latest BSR) having the BSR index corresponding to the latest buffer size to the base station 20.

The base station 20 receives the latest BSR from the terminal 10, and estimates a buffer size of the terminal 10 based on the BSR index indicated in the latest BSR. In this case, the base station 20 converts the BSR index indicated in the latest BSR into a buffer size value according to the same BSR index table as that of the terminal 10. It is expected that the buffer estimation amount of the terminal 10 is updated based on the latest BSR, which terminal requires to what extent of wireless resource is recognized, and appropriate scheduling is performed. The base station 20 performs scheduling of a wireless resource based on the latest buffer estimation amount. As a result, in a case where a wireless resource is allocated to the terminal 10, uplink grant is issued (S4).

The terminal 10 receives the uplink grant from the base station 20, extracts data (also referred to as uplink (UL) data) with a size corresponding to an allocated data amount (also referred to as an allocation amount) from the transmission buffer, and transmits the data to the base station 20 by using the allocated wireless resource (S5).

A description will be made of an example of the BSR index table referred to in the BSR transmission sequence. FIG. 2 is a diagram illustrating examples of contents of the BSR index tables of the terminal 10 and the base station 20 in the wireless communication system 1. In the BSR index table illustrated in FIG. 2, a range from 0 bytes that is a lower limit value of the buffer to 3000 kbytes that is an upper limit value of the buffer is divided into 64 small ranges, and BSR indexes of 0 to 63 are respectively associated with the respective small ranges. For example, the small range "4940<BS<=6074" is associated with the BSR index with "32" as an index value. For example, a buffer estimation amount BS corresponding to the small range "4940<BS<=6074" is in a range of being more than 4940 bytes and being equal to or less than 6074 bytes. The BSR index table is included in the terminal 10 and the base station 20 of the wireless communication system 1.

Next, a description will be made of a specific example in which the situation may occur. FIG. 3 is a diagram illustrating a situation that may occur due to deterioration in estimation accuracy of a buffer estimation amount in the base station 20. First, the terminal 10 acquires a buffer size of 6000 bytes by referring to an amount (buffer size) of data stored in the buffer when a BSR is transmitted by using a wireless resource allocated from the base station 20. The terminal 10 acquires the BSR index "32" corresponding to the small range "4940<BS<=6074" corresponding to the buffer size of 60000 bytes according to the BSR index table.

The terminal 10 transmits a BSR having the BSR index "32" to the base station 20. Consequently, the base station 20 acquires the BSR index "32" indicated in the BSR received from the terminal 10, and specifies the small range "4940<BS<=6074" corresponding to the BSR index "32" so as to acquire the buffer estimation amount "4940<BS<=6074" of the terminal 10, according to the BSR index table.

In scheduling for the terminal 10, the base station 20 determines an allocation amount of a wireless resource to the terminal 10 based on, for example, the range "4940<BS<=6074" indicated by the buffer estimation amount. In the example illustrated in FIG. 3, as an allocation amount to the terminal 10, 5000 bytes is allocated. The base station 20 transmits, to the terminal 10 uplink grant (UL grant) indicating the allocation amount "5000 bytes" to the terminal 10.

The terminal 10 receives the uplink grant from the base station 20, extracts data corresponding to the allocation amount "5000 bytes" indicated in the uplink grant from the transmission buffer, and transmits the data (UL data: length of 5000 bytes) to the base station 20 by using the allocated wireless resource. In the example illustrated in FIG. 3, a buffer size of the terminal 10 after the data (UL data: length of 5000 bytes) is transmitted is 1000 bytes by subtracting 5000 bytes from 6000 bytes.

In the actual wireless communication system 1, it is noted that the terminal 10 may not transmit data with the same data length as an allocation amount indicated in uplink grant. For example, a signal such as header information (for example, a medium access control (MAC) header) used in processing in a layer on a protocol stack is added to transmission data, and thus a part of an allocation amount may be consumed in the header information. However, in a specific example of a numerical value described in the present disclosure, a resource amount to be distributed to header information or the like is assumed not to be taken into consideration for simplification of description. Therefore, in the present disclosure, an allocation amount of a wireless resource allocated to the terminal 10 by the base station 20 may be set to a value obtained by adding a resource amount to be distributed to header information or the like to a numerical value example of an allocation amount described in the present disclosure. As a signal added in addition to header information, for example, there may be a code series called cyclic redundancy check (CRC). This is also the same for the following description.

The base station 20 receives the data (UL data: length of 5000 bytes) from the terminal 10, and updates the buffer estimation amount of the terminal 10 based on the data length of the received data. In the example illustrated in FIG. 3, an upper limit value of the buffer estimation amount after being updated becomes "1074 bytes" by subtracting the data length "5000 bytes" of the received data from the upper limit value "6074 bytes" of the buffer estimation amount before being updated. A lower limit value of the buffer estimation amount after being updated becomes "0 bytes" by subtracting the data length "5000 bytes" of the received data from the lower limit value "4940 bytes" of the buffer estimation amount before being updated. In a case where a value after update becomes a negative value in the subtraction, a lower limit value after update becomes a value including "0 bytes". As a result, the base station 20 updates the buffer estimation amount of the terminal 10 after receiving the data (UL data: length of 5000 bytes) to a range "0<=BS<=1074".

In scheduling for the terminal 10, the base station 20 determines an allocation amount of a wireless resource to the terminal 10 based on the range "0<=BS<=1074" indicated by the buffer estimation amount. In the example illustrated in FIG. 3, "1100 bytes" is allocated as an allocation amount of a wireless resource to the terminal 10. The base station 20 transmits, to the terminal 10, uplink grant indicating the allocation amount "1100 bytes" to the terminal 10.

The terminal 10 receives the uplink grant (allocation amount: 1100 bytes) from the base station 20, extracts data corresponding to the allocation amount "1100 bytes" indicated in the uplink grant from the transmission buffer, and transmits the data (UL data: length of 5000 bytes) to the base station 20 by using the allocated wireless resource. In this case, new data (UL data: length of 5000 bytes) is added to the transmission buffer of the terminal 10, and thus a buffer size of the terminal 10 after the data is transmitted is 4900 bytes by subtracting 1100 bytes from 6000 bytes.

On the other hand, the base station 20 receives the data (UL data: length of 1100 bytes) from the terminal 10, and updates the buffer estimation amount of the terminal 10 based on the data length of the received data. In the example illustrated in FIG. 3, the buffer estimation amount of the terminal 10 after being updated becomes "0 bytes" by subtracting the data length "1100 bytes" of the received data from the upper limit value "1074 bytes" of the buffer estimation amount before being updated. As a result, the base station 20 stops scheduling of a wireless resource for the terminal 10. Therefore, transmission of data stored in the transmission buffer is stopped until the terminal 10 transmits a scheduling request to the base station 20 and is thus allocated with a wireless resource. Transmission of a scheduling request to the base station 20 is performed with, as a trigger, for example, a timing at which a predetermined timer expires in the terminal 10, and thus a latency occurs such that usage efficiency of a wireless resource deteriorates.

The situation may also occur in a case where data stored in the transmission buffer is discarded. FIG. 4 is a diagram (second) illustrating a situation that may occur due to deterioration in estimation accuracy of a buffer estimation amount in the base station 20. In the example illustrated in FIG. 4, an initial buffer size of the terminal 10 is "6000 bytes" in the same manner as in the example illustrated in FIG. 3. Thus, the terminal 10 transmits a BSR having the BSR index "32" to the base station 20. In the same manner as in the example illustrated in FIG. 3, the base station 20 acquires the range "4940<BS<=6074" as a buffer estimation amount of the terminal 10.

In scheduling for the terminal 10, the base station 20 determines "500 bytes" as an allocation amount of a wireless resource to the terminal 10 based on, for example, the range "4940<BS<=6074" indicated by the buffer estimation amount. The base station 20 transmits, to the terminal 10 uplink grant (allocation amount: 500 bytes) indicating the allocation amount "500 bytes" to the terminal 10.

The terminal 10 receives the uplink grant from the base station 20, extracts data (also referred to as transmission data) corresponding to the allocation amount "500 bytes" indicated in the uplink grant from the transmission buffer, and transmits the data (UL data: length of 500 bytes) to the base station 20 by using the allocated wireless resource. As a result, a buffer size of the terminal 10 after the data (UL data: length of 500 bytes) is transmitted is 5500 bytes by subtracting the data length (500 bytes) of the transmitted data from 6000 bytes.

The base station 20 receives the data (UL data: length of 500 bytes) from the terminal 10, and updates the buffer estimation amount of the terminal 10 based on the data length of the received data. In the example illustrated in FIG. 4, an upper limit value of the buffer estimation amount after being updated becomes "5574 bytes" by subtracting the data length "500 bytes" of the received data from the upper limit value "6074 bytes" of the buffer estimation amount before being updated. A lower limit value of the buffer estimation amount after being updated becomes "4440 bytes" by subtracting the data length "500 bytes" of the received data from the lower limit value "4940 bytes" of the buffer estimation amount before being updated. As a result, the base station 20 updates the buffer estimation amount of the terminal 10 after receiving the data (UL data: length of 5000 bytes) to a range "4440<=BS<=5574".

In scheduling for the terminal 10, the base station 20 determines an allocation amount of a wireless resource to the terminal 10 based on the range "4440<=BS<=5574" indicated by the buffer estimation amount. In the example illustrated in FIG. 4, as an allocation amount of a wireless resource to the terminal 10, "500 bytes" is allocated. The base station 20 transmits, to the terminal 10, uplink grant indicating the allocation amount "500 bytes" to the terminal 10.

However, in the example illustrated in FIG. 4, the terminal 10 discards some data (length of 5000 bytes) of data (length of 5500 bytes) stored in the transmission buffer before receiving the uplink grant (allocation amount: 500 bytes)

from the base station 20. As a result, data with the length of 500 bytes is stored in the transmission buffer of the terminal 10. The data discarding may occur due to a process such as PDCP SDU Discard or active queue management (AQM) performed in a Packet Data Convergence Protocol (PDCP) layer that is an upper layer of a medium access control (MAC) layer. The terminal 10 receives the uplink grant (allocation amount: 500 bytes) from the base station 20, extracts data corresponding to the allocation amount "500 bytes" indicated in the uplink grant from the transmission buffer, and transmits the data (UL data: length of 500 bytes) to the base station 20 by using the allocated wireless resource. A buffer size of the terminal 10 after the data (UL data: length of 500 bytes) is transmitted is 0 bytes by subtracting the data length (500 bytes) of the transmitted data from 500 bytes.

On the other hand, the base station 20 receives the data (UL data: length of 500 bytes) from the terminal 10, and updates the buffer estimation amount of the terminal 10 based on the data length of the received data. In the example illustrated in FIG. 4, an upper limit value of the buffer estimation amount after being updated becomes "5074 bytes" by subtracting the data length "500 bytes" of the received data from the upper limit value "5574 bytes" of the buffer estimation amount before being updated. A lower limit value of the buffer estimation amount after being updated becomes "3940 bytes" by subtracting the data length "500 bytes" of the received data from the lower limit value "4440 bytes" of the buffer estimation amount before being updated. As a result, the base station 20 continuously performs scheduling of a wireless resource for the terminal 10. However, data to be transmitted is not stored in the transmission buffer, and, even though the terminal 10 receives uplink grant from the base station 20, there is no data to be transmitted, and thus a signal including padding bits is transmitted. Thus, usage efficiency of a wireless resource deteriorates.

As mentioned above, in the wireless communication system 1, estimation accuracy of a buffer estimation amount in the base station 20 deteriorates, and thus usage efficiency of a wireless resource may deteriorate. As described above, in the fifth generation mobile communication system, a new application of wireless communication such as the IoT is supposed, and a life cycle of data occurring in a terminal may be remarkably accelerated. Thus, in a case of following a BSR transmission method of the related art, there is concern that buffer estimation in the base station 20 may not track a variation of a buffer status of a terminal due to acceleration of the data life cycle, and thus estimation accuracy of a buffer estimation amount may deteriorate.

According to one aspect of the present disclosure, there is provided a new BSR transmission technique enabling buffer estimation in a base station to track a variation of a buffer status of a terminal. The situation may be found in a case where the fifth generation mobile communication system is examined from one aspect, and it is noted that other situations may be found in a case where the fifth generation mobile communication system is examined from other aspects. For example, the features and advantages of the embodiments are not limited to solving the situations, and may be understood throughout the entire embodiments described below.

Configurations of the embodiments described below are examples for embodying the technical spirit of the present disclosure, and the present disclosure is not intended to be limited to the configurations of the embodiments and is similarly applicable to other embodiments included in the claims. For example, various names such as MAC may be changed in future development of specifications of the fifth generation mobile communication system. In mobile communication systems after the fifth generation mobile communication system, each name may be changed. In the following description, as an example of a status report of the transmission buffer of the terminal 10, an example of a process in a MAC layer is used, but it is noted that a status report is not intended to be limited thereto.

Example 1

Figure 5:
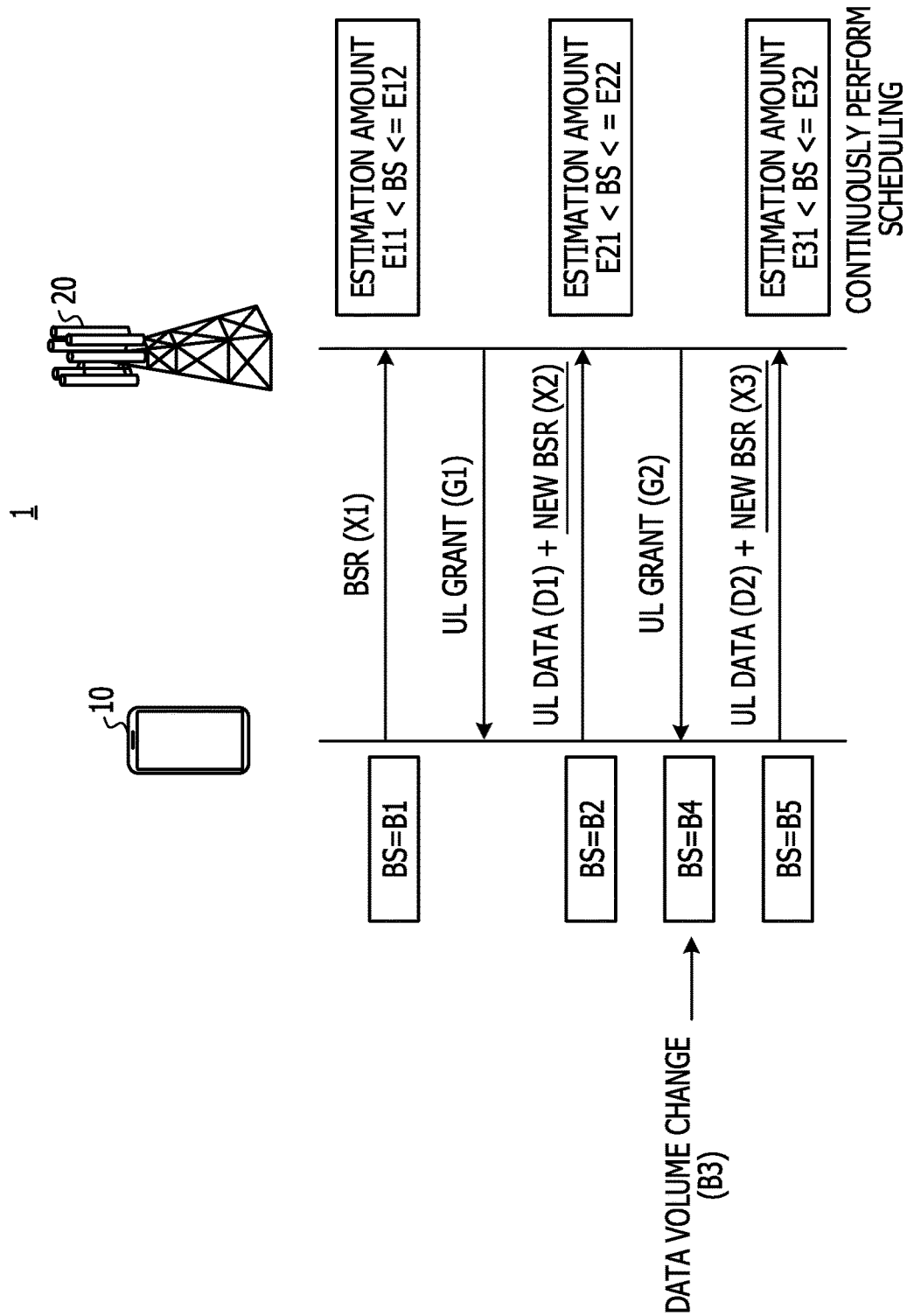
FIG. 5 is a diagram illustrating an example of a BSR transmission sequence in a wireless communication system according to Example 1.

FIG. 5 is a diagram illustrating an example of a BSR transmission sequence in the wireless communication system 1 according to Example 1. In the example illustrated in FIG. 5, the terminal 10 allocates a part of an allocation amount indicated in uplink grant to be used for BSR transmission when the uplink grant is received from the base station 20 and uplink data (also referred to as UL data) is transmitted. Consequently, whenever data is received from the terminal 10, the base station 20 may perform estimation of a buffer size of the terminal 10 based on the latest BSR and may thus suppress deterioration in estimation accuracy of a buffer estimation amount.

Hereinafter, a sequence example illustrated in FIG. 5 will be described in order. In the example illustrated in FIG. 5, an initial buffer size of the terminal 10 is "B1". In the following description, the unit of various data lengths such as a buffer size is a byte unless otherwise mentioned.

The terminal 10 converts the buffer size "B1" into a BSR index "X1" according to the BSR index table. For example, the terminal 10 acquires the BSR index "X1" corresponding to a small range "E11<BS<=E12" including the latest buffer size "B1". A relationship between the buffer size "B1" and the small range is expressed by, for example, "E11<B1<=E12".

The terminal 10 transmits a BSR (BSR (X1)) having the BSR index "X1" to the base station 20. The base station 20 inversely converts the BSR index "X1" according to the BSR index table, so as to acquire the small range "E11<BS<=E12" having the lower limit value "E11" and the upper limit value "E12", and estimates the range "E11<BS<=E12" as a buffer estimation amount of the terminal 10. A relationship between the buffer size "B1" of the terminal 10 and the small range is expressed by, for example, "E11<B1<=E12".

In scheduling for the terminal 10, the base station 20 determines, for example, "G1" as an allocation amount (also referred to as a first allocation amount) of a wireless resource to the terminal 10 based on the range "E11<BS<=E12" indicated by the buffer estimation amount. A relationship between the allocation amount "G1" and the buffer estimation amount is expressed by, for example, "E11<G1<=E12". The base station 20 transmits uplink grant (allocation amount: G1) indicating the allocation amount "G1" to the terminal 10, to the terminal 10.

The terminal 10 receives the uplink grant from the base station 20, and allocates a part of the allocation amount "G1" indicated in the uplink grant to BSR transmission. The terminal 10 extracts, from the transmission buffer, data corresponding to an allocation amount (also referred to as a residual allocation amount or a third allocation amount) obtained by subtracting the amount (also referred to as an allocation amount for BSR transmission or a second allocation amount) allocated to BSR transmission. For example, a relationship among the first allocation amount, the second allocation amount, and the third allocation amount is expressed by, for example, "the first allocation amount=the second allocation amount+the third allocation amount".

The terminal 10 acquires the latest buffer size "B2" after data with a data length corresponding to the residual allocation amount is extracted, and converts the latest buffer size "B2" according to the BSR index table, so as to acquire the latest BSR index "X2". For example, the terminal 10 acquires the BSR index "X2" corresponding to a small range "E21<BS<=E22" including the latest buffer size "B2". A relationship between the buffer size "B2" and the small range is expressed by, for example, "E21<B2<=E22".

As a method of the terminal 10 acquiring the latest buffer size "B2", the terminal 10 may acquire the latest buffer size "B2", for example, by subtracting the residual allocation amount (third allocation amount) from the buffer size "B1" before data is extracted.

The terminal 10 transmits a BSR (New BSR (X2)) having UL data (UL data (D1)) with a data length "D1" corresponding to the residual allocation amount and the latest BSR index "X2" to the base station 20 by using the allocated wireless resource.

The base station 20 receives the BSR (New BSR (X2)) having the UL data (UL data (D1)) and the latest BSR index "X2" from the terminal 10. The base station 20 inversely converts the latest BSR index "X2" according to the BSR index table, so as to acquire the small range "E21<BS<=E22" having the lower limit value "E21" and the upper limit value "E22", and acquires the range "E21<BS<=E22" as a buffer estimation amount of the terminal 10. Consequently, the base station 20 may update the buffer estimation amount of the terminal 10 based on the latest BSR from the terminal 10. A relationship between the buffer size "B2" of the terminal 10 and the small range is expressed by, for example, "E21<B2<=E22".

In scheduling for the terminal 10, the base station 20 determines an allocation amount of a wireless resource to the terminal 10 based on the range "E21<BS<=E22" indicated by the buffer estimation amount. In the example illustrated in FIG. 5, "G2" is allocated as the allocation amount of the wireless resource to the terminal 10. A relationship between the allocation amount "G2" and the buffer estimation amount is expressed by, for example, "E21<G2<=E22". The base station 20 transmits uplink grant indicating the allocation amount "G2" to the terminal 10, to the terminal 10.

In the example illustrated in FIG. 5, a buffer size of the transmission buffer is varied (data length: B3), and the latest buffer size is changed to "B4", before the terminal 10 receives the uplink grant (allocation amount: G2) from the base station 20. A relationship among the buffer size "B2" before being varied, the varied amount "B3", and the buffer size "B4" after being varied is expressed by, for example, "B4=B2+B3". The varied amount "B3" may be a positive number, and may be a negative number. For example, in a case where the varied amount "B3" is a positive number, this indicates that new data with a data length corresponding to the varied amount is added to the transmission buffer. For example, in a case where the varied amount "B3" is a negative number, this indicates that data with a data length corresponding to the varied amount "B3" is discarded from the transmission buffer.

The terminal 10 receives the uplink grant (allocation amount: G2) from the base station 20, and allocates a part of the allocation amount "G2" indicated in the uplink grant to BSR transmission. The terminal 10 extracts data corresponding to the residual allocation amount (also referred to as a third allocation amount) from the transmission buffer. Consequently, a buffer size after data extraction becomes "B5". The terminal 10 converts the latest buffer size "B5" according to the BSR index table, so as to acquire the latest BSR index "X3". For example, the terminal 10 acquires the BSR index "X3" corresponding to a small range "E31<BS<=E32" including the latest buffer size "B5". A relationship between the buffer size "B5" and the small range is expressed by, for example, "E31<B5<=E32".

The terminal 10 transmits a BSR (New BSR (X3)) having UL data (UL data (D2)) with a data length "D2" corresponding to the residual allocation amount and the latest BSR index "X3" to the base station 20 by using the allocated wireless resource. In the example illustrated in FIG. 5, the terminal 10 transmits the BSR (New BSR (X3)) having the UL data (UL data (D2)) and the BSR index "X3" to the base station 20.

The base station 20 receives the BSR (New BSR (X3)) having the UL data (UL data (D2)) and the latest BSR index "X3" from the terminal 10. The base station 20 converts the latest BSR index "X3" according to the BSR index table, so as to acquire a buffer estimation amount "E31<BS<=E32" of the terminal 10. Consequently, the base station may update the buffer estimation amount of the terminal 10 based on the latest BSR from the terminal 10. As a result, in the example illustrated in FIG. 5, the base station 20 may continuously perform scheduling of a wireless resource for the terminal 10, and the terminal 10 may be appropriately allocated with a wireless resource.

Example 2

Figure 6:
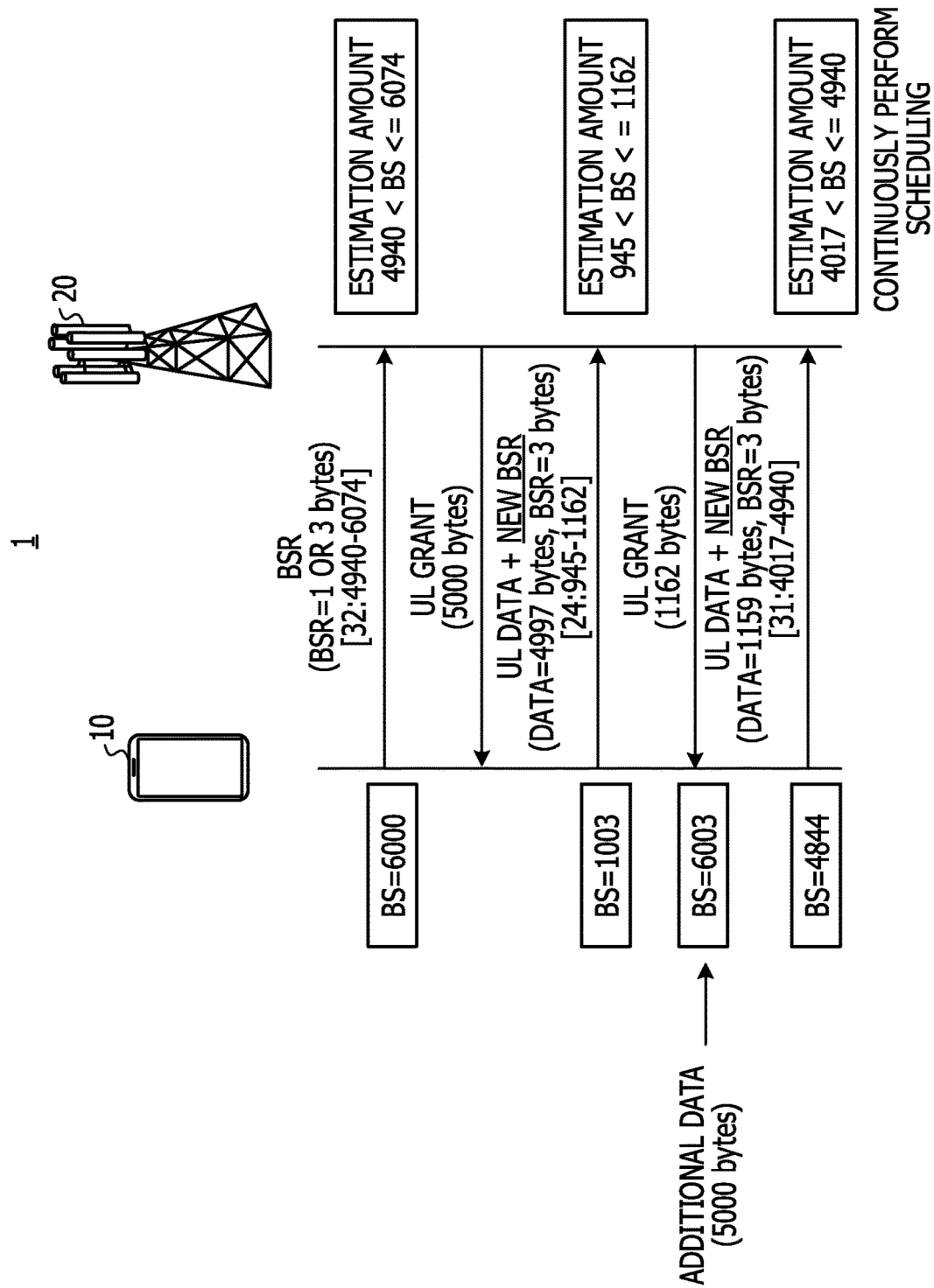
FIG. 6 is a diagram illustrating an example of a BSR transmission sequence in a wireless communication system according to Example 2.

FIG. 6 is a diagram illustrating an example of a BSR transmission sequence in the wireless communication system 1 according to Example 2. In the example illustrated in FIG. 6, the terminal 10 allocates a part of an allocation amount indicated in uplink grant to be used for BSR transmission when the uplink grant is received from the base station 20 and data is transmitted. Consequently, whenever data is received from the terminal 10, the base station 20 may perform estimation of a buffer size of the terminal 10 based on the latest BSR and may thus suppress deterioration in estimation accuracy of a buffer estimation amount.

Hereinafter, a sequence example illustrated in FIG. 6 will be described in order. In the example illustrated in FIG. 6, an initial buffer size of the terminal 10 is "6000 bytes" in the same manner as in the example illustrated in FIG. 3. Thus, the terminal 10 converts the buffer size into the BSR index "32" according to the BSR index table, and transmits a BSR having the BSR index "32" to the base station 20. The base station 20 inversely converts the BSR index "32" according to the BSR index table, so as to acquire the small range "4940<BS<=6074" of the buffer size, and estimates the range "4940<BS<=6074" as a buffer estimation amount of the terminal 10.

In scheduling for the terminal 10, the base station 20 determines "5000 bytes" as an allocation amount of a wireless resource to the terminal 10 based on, for example, the range "4940<BS<=6074" indicated by the buffer estimation amount. The base station 20 transmits, to the terminal 10, uplink grant (allocation amount: 5000 bytes) indicating the allocation amount "5000 bytes" to the terminal 10.

The terminal 10 receives the uplink grant from the base station 20, and allocates a part of the allocation amount "5000 bytes" indicated in the uplink grant to BSR transmission. The terminal 10 extracts, from the transmission buffer, data corresponding to an allocation amount (also referred to as a residual allocation amount) obtained by subtracting the amount (also referred to as an allocation amount for BSR transmission) allocated to BSR transmission. The terminal 10 acquires the latest buffer size after data with a data length corresponding to the residual allocation amount is extracted, and converts the latest buffer size according to the BSR index table, so as to acquire the latest BSR index.

In the example illustrated in FIG. 6, among the allocation amount "5000 bytes" indicated in the uplink grant, "3 bytes" is allocated to be used for BSR transmission. In this case, a residual allocation amount is "4997 bytes" by subtracting the allocation amount "3 bytes" for BSR transmission from the allocation amount "5000 bytes" indicated in the uplink grant. The terminal 10 acquires "1003 bytes" as the latest buffer size after data corresponding to the residual allocation amount is extracted by subtracting the residual allocation amount "4997 bytes" from the buffer size "6000 bytes" before the data is extracted. According to the example of the BSR index table illustrated in FIG. 2, the latest BSR index is the BSR index "24" corresponding to the small range "945<BS<=1162" including the latest buffer size "1003 bytes".

The terminal 10 transmits a BSR (New BSR) having data (UL Data) with a data length corresponding to the residual allocation amount and the latest BSR index to the base station 20 by using the allocated wireless resource. In the example illustrated in FIG. 6, the terminal 10 transmits the BSR (New BSR) having the data (UL Data: length of 4997 bytes) and the BSR index "24" to the base station 20.

The base station 20 receives the BSR (New BSR) having the data (UL Data: length of 4997 bytes) and the BSR index "24" from the terminal 10. The base station 20 converts the latest BSR index "24" according to the BSR index table, so as to acquire a buffer estimation amount "945<BS<=1162" of the terminal 10. Consequently, the base station may update the buffer estimation amount of the terminal 10 based on the latest BSR whenever data is received from the terminal 10.

In scheduling for the terminal 10, the base station 20 determines an allocation amount of a wireless resource to the terminal 10 based on the range "945<BS<=1162" indicated by the buffer estimation amount. In the example illustrated in FIG. 6, "1162 bytes" is allocated as an allocation amount of a wireless resource to the terminal 10. The base station 20 transmits uplink grant indicating the allocation amount "1162 bytes" to the terminal 10, to the terminal 10.

In the example illustrated in FIG. 6, new data (data length: 5000 bytes) is added to the transmission buffer of the terminal 10, and thus the latest buffer size is changed to "6003 bytes", before the uplink grant (allocation amount: 1162 bytes) is received from the base station 20.

The terminal 10 receives the uplink grant (allocation amount: 1162 bytes) from the base station 20, and allocates a part of the allocation amount "1162 bytes" indicated in the uplink grant to BSR transmission. The terminal 10 extracts data corresponding to the residual allocation amount "1159 bytes" from the transmission buffer. Consequently, a buffer size after data extraction becomes "4844 bytes". The terminal 10 converts the latest buffer size according to the example of the BSR index table illustrated in FIG. 2, so as to acquire the latest BSR index. For example, the terminal 10 acquires the BSR index "31" corresponding to a small range "4017<BS<=4940" including the latest buffer size "4844 bytes".

The terminal 10 transmits a BSR (New BSR) having data (UL Data) with a data length corresponding to the residual allocation amount and the latest BSR index to the base station 20 by using the allocated wireless resource. In the example illustrated in FIG. 6, the terminal 10 transmits the BSR (New BSR) having the UL data (UL Data: length of 1159 bytes) and the BSR index "31" to the base station 20.

The base station 20 receives the BSR (New BSR) having the UL data (UL Data: length of 1159 bytes) and the latest BSR index "31" from the terminal 10. The base station 20 converts the latest BSR index "31" according to the BSR index table, so as to acquire a buffer estimation amount "4017<BS<=4940" of the terminal 10. Consequently, the base station may update the buffer estimation amount of the terminal 10 based on the latest BSR (New BSR) whenever data is received from the terminal 10. As a result, in the example illustrated in FIG. 6, the base station 20 may continuously perform scheduling of a wireless resource for the terminal 10, and the terminal 10 may be appropriately allocated with a wireless resource.

The above description relates to an example of the BSR transmission sequence in the wireless communication system 1 according to Example 2. For comparison between an example of the related art and Example 2, in the example illustrated in FIG. 6, a description will be made of a case where the terminal 10 performs an operation of the related art of not allocating a part of an allocation amount to BSR transmission when uplink grant (allocation amount: 1162 bytes) is received from the base station 20. In this case, the terminal 10 extracts, from the transmission buffer, data corresponding to the allocation amount (1162 bytes) indicated in uplink grant from the base station 20, and transmits the data with the data length "1162 bytes" to the base station. In other words, in the BSR transmission sequence of the related art, the terminal 10 does not transmit the latest BSR when transmitting data.

In the example of the related art, since the latest BSR is not included in the data received from the terminal 10, the base station 20 may not recognize that the new data (data length: 5000 bytes) has been added to the transmission buffer of the terminal 10. Thus, the base station 20 updates the buffer estimation amount of the terminal 10 to "0 bytes" according to reception of the data (data length: 1162 bytes) from the terminal 10. As a result, estimation accuracy of a buffer estimation amount of the terminal 10 deteriorates. The base station 20 stops scheduling of a wireless resource for the terminal 10 based on the buffer estimation amount of which estimation accuracy deteriorates. Therefore, transmission of data stored in the transmission buffer is stopped until the terminal 10 transmits a scheduling request to the base station 20 and is thus allocated with a wireless resource. Transmission of a scheduling request to the base station 20 is performed with, as a trigger, for example, a timing at which a predetermined timer expires in the terminal 10, and thus a latency occurs such that usage efficiency of a wireless resource deteriorates.

According to Example 2, the terminal 10 allocates a part of an allocation amount indicated in uplink grant from the base station 20 to be used for BSR transistor, and transmits the latest BSR when data (UL Data) is transmitted. Thus, the base station 20 updates a buffer estimation amount of the terminal 10 based on the latest BSR, and thus enables the buffer estimation amount to track a variation of a buffer status of the terminal 10 such that deterioration in estimation accuracy may be reduced. For example, the terminal 10 allocates a part of an allocation amount indicated in uplink grant from the base station 20 to be used for BSR transistor, transmits the latest BSR when data (UL Data) is transmitted, and thus enables a buffer estimation amount estimated in the base station 20 to track a variation of a buffer status of the terminal 10. As a result, it is expected that the base station 20 recognizes which terminal requires to what extent of wireless resource, and thus performs appropriate scheduling. For example, the terminal 10 may be appropriately allocated with a wireless resource.

In FIG. 6, a description has been made of an example in which new data is added before uplink grant is received from the base station 20, but Example 2 is not limited thereto. For example, in the same manner as in the example illustrated in FIG. 4, it is noted that Example 2 may also be applied to a case where some data in the transmission buffer is discarded before uplink grant is received from the base station 20.

Figure 7:
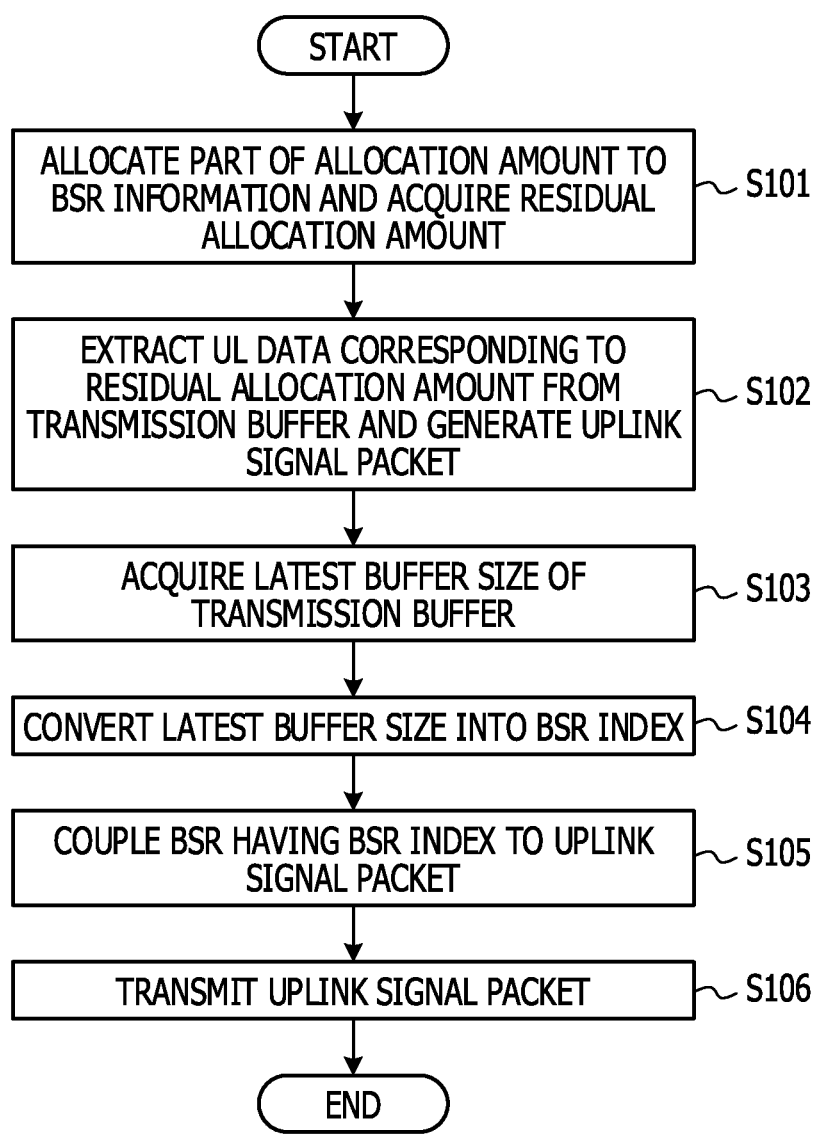
FIG. 7 is a diagram illustrating an example of a flow of a process in a terminal according to Example 2.

Next, a description will be made of an example of a flow of a process in the terminal 10. FIG. 7 is a diagram illustrating an example of a flow of a process in the terminal 10 according to Example 2. For example, the terminal 10 may execute the flow of the process illustrated in FIG. 7 in response to reception of uplink grant (UL grant) from the base station 20.

The terminal 10 allocates a part of an allocation amount indicated in the uplink grant to BSR transmission, and acquires a residual allocation amount (S101). In process S101, the terminal 10 may acquire the residual allocation amount by subtracting a resource amount (allocation amount for BSR transmission) allocated to BSR transmission from the allocation amount indicated in the uplink grant.

In a wireless communication system conforming to a communication standard of the 3GPP, several types of BSRs are supposed as a BSR transmitted to the base station 20 from the terminal 10. For example, there are a short-BSR (for example, a length of 1 byte) used in a case where there is only a single logical channel group into which a plurality of logical channels are integrated and a long-BSR (for example, a length of 3 bytes) used in a case where there are a plurality of logical channel groups. In process S101, the terminal 10 may determine an allocation amount for BSR transmission based on the type of BSR according to a usage status of a logical channel. For example, in a case where there is only a single logical channel group, the terminal 10 may determine the allocation amount for BSR transmission based on a data length of the short-BSR. For example, in a case where a header (also referred to as a MAC header) added to the short-BSR has a length of 2 bytes, an allocation amount for BSR transmission based on a data length of the short-BSR may be a length of 3 bytes. Alternatively, in a case where a MAC header added to the short-BSR has a length of 1 byte, an allocation amount for BSR transmission based on a data length of the short-BSR may be a length of 2 bytes.

The terminal 10 extracts UL data corresponding to the residual allocation amount from the transmission buffer according to a predetermined algorithm, and generates an uplink signal packet (S102). An example of the uplink signal packet may include a medium access control-packet data unit (MAC-PDU). In process S102, the terminal 10 may divide the data as appropriate such that a data length of the generated MAC-PDU is included in a predetermined length. The predetermined length may be referred to as a transport block (TB) size. The TB size may be adjusted as appropriate according to electric wave quality of wireless communication between the terminal 10 and the base station 20.

The terminal 10 acquires the latest buffer size of the transmission buffer (S103), and converts the latest buffer size into a BSR index according to the BSR index table (S104). Examples of contents of the BSR index table are exemplified in FIG. 2.

The terminal 10 generates a BSR-MAC control element (also referred to as a BSR-MAC-CE) having the BSR index acquired in process S104, adds a MAC header thereto, and couples the BSR-MAC control element to the uplink signal packet generated in process S102 (S105). In process S105, the terminal 10 may add an information element having the BSR index to the rear side of the uplink signal packet generated in process S102, and may add the information element to the front side thereof. According to one aspect of the fifth generation mobile communication system, there is a case where the information element having the BSR index is preferably added to the rear side of the uplink signal packet. An example of the uplink signal packet may include a MAC-PDU. An example of the information element may include a medium access control-service data unit (MAC-SDU). An information element storing a BSR index may be referred to as a MAC-SDU storing the BSR index, may be referred to as a MAC control element, and may be referred to as a BSR.

The terminal 10 transmits the uplink signal packet added with the information element having the latest BSR index to the base station 20 (S106). In process S106, the terminal 10 may add a signal series based on a predetermined algorithm to the uplink signal packet added with the information having the latest BSR index when the uplink signal packet is forwarded to a lower layer on a protocol stack. An example of the signal series may include codes (also referred to as error correction code (ECC)) used to detect an error, such as CRC.

Figure 8:
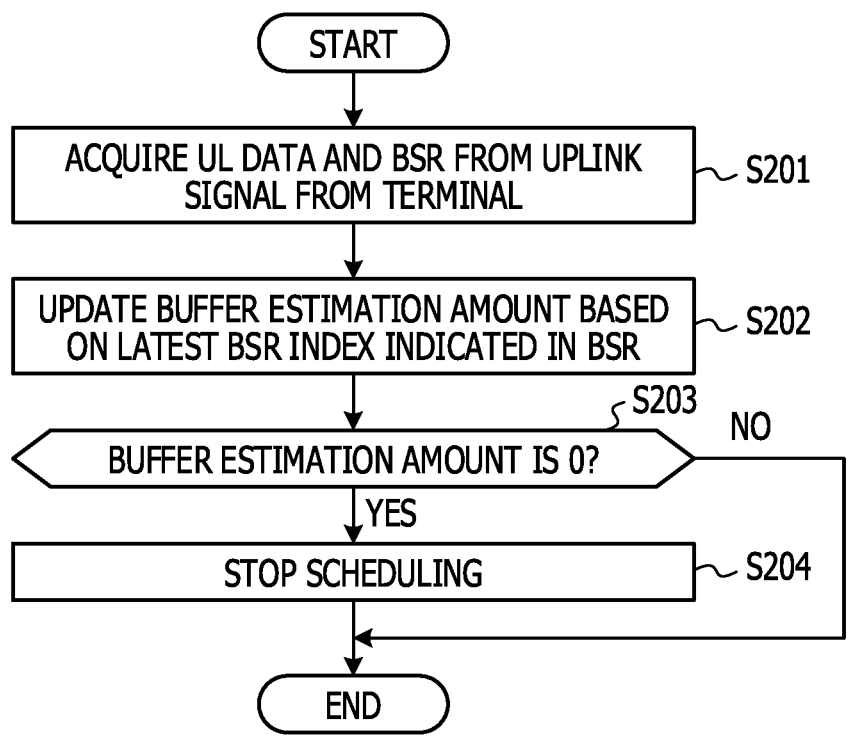
FIG. 8 is a diagram illustrating an example of a flow of a process in a base station according to Example 2.

The above description relates to an example of the flow of the process in the terminal 10 according to Example 2. Next, a description will be made of a flow of a process in the base station 20 according to Example 2. FIG. 8 is a diagram illustrating an example of a flow of a process in the base station 20 according to Example 2. For example, the base station 20 may execute the flow of the process illustrated in FIG. 8 in response to reception of an uplink signal from the terminal 10.

The base station 20 acquires UL data and a BSR from the uplink signal received from the terminal 10 (S201). In process S201, for example, the base station 20 may differentiate an information element storing the UL data from an information element storing the BSR by referring to identifiers respectively associated with a plurality of information elements included in the uplink signal from the terminal 10. An example of an information element may include a medium access control-service data unit (MAC-SDU). The MAC-SDU storing the BSR may also be referred to as a MAC control element. An example of an identifier associated with an information element may include a logical channel identifier (LCID). For example, according to NPL 5 (3GPP TS 36.321 V14. 2.0 (2017-03)), an LCID indicating a short-BSR is "11101", and an LCID indicating a long-BSR is "11110". It is noted that such values are only examples, and may be changed due to a future specification change.

The base station 20 updates a buffer estimation amount of the terminal 10 based on the latest BSR index indicated in the BSR (S202). In process S202, the base station 20 converts the latest BSR index into a buffer size according to the BSR index table exemplified in FIG. 2. For example, the BSR index "32" is converted into a buffer size value having a lower limit value of "4940 bytes" and an upper limit value of "6074 bytes" according to the BSR index table exemplified in FIG. 2, and the buffer estimation amount of the terminal 10 is updated based on the values.

The base station 20 determines whether or not the buffer estimation amount updated in process S202 is 0 (S203). In a case where the updated buffer estimation amount is 0 (YES in S203), the base station 20 may stop scheduling of a wireless resource for the terminal 10 (S204). On the other hand, in a case where the updated buffer estimation amount is not 0 (NO in S203), the base station 20 may continuously perform scheduling of a wireless resource for the terminal 10.

The above description relates to an example of the flow of the process in the base station 20 according to Example 2. In the example of the process illustrated in FIG. 8, description of a detailed flow of a scheduling process of a wireless resource in the base station 20 is omitted for simplification of the description. With the flow of the process, it is expected that the base station 20 updates a buffer estimation amount of the terminal 10 based on the latest BSR, recognizes which terminal requires to what extent of wireless resource is recognized, and performs appropriate scheduling.

Example 3

Figure 9:
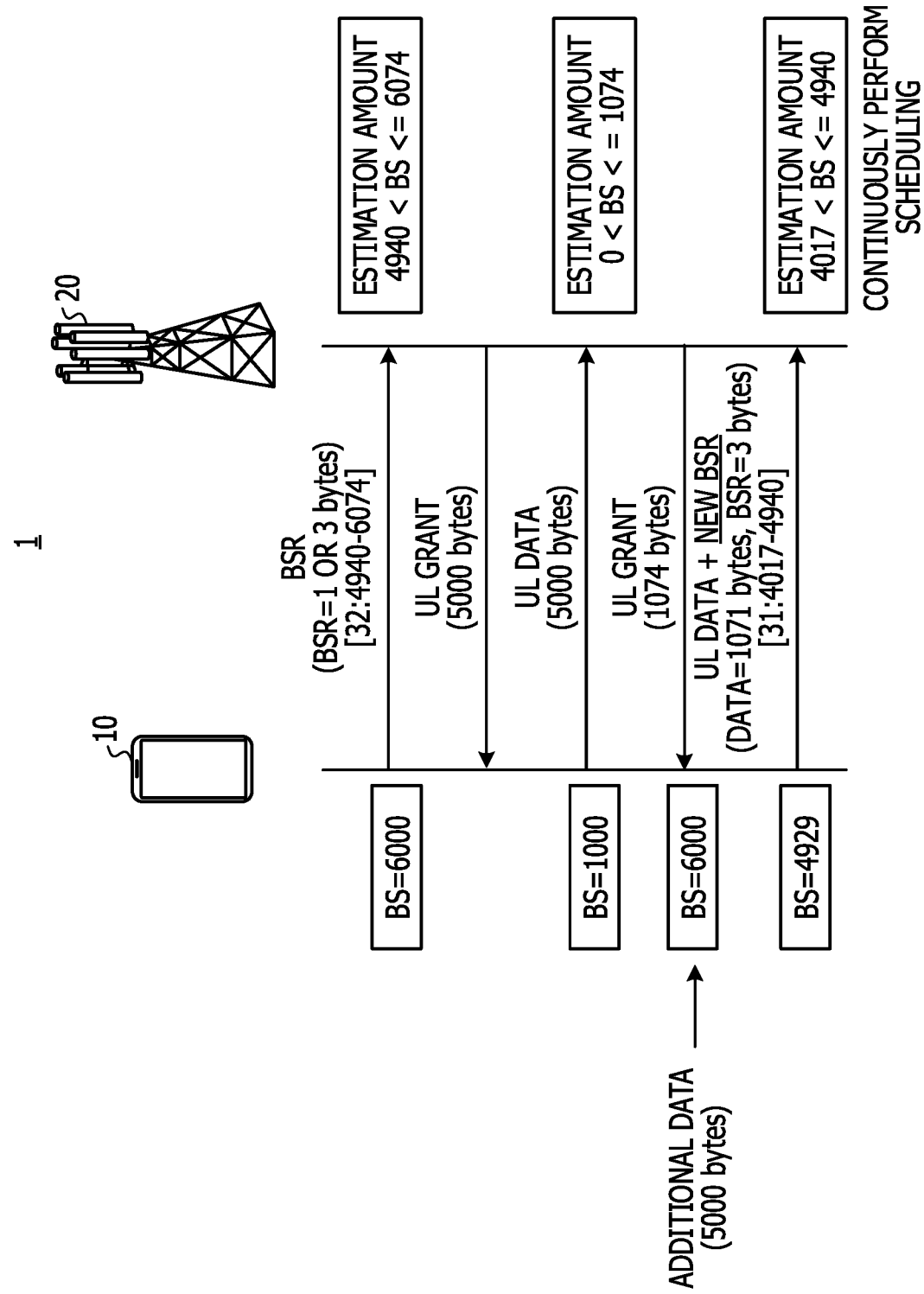
FIG. 9 is a diagram illustrating an example of a BSR transmission sequence in a wireless communication system according to Example 3.

FIG. 9 is a diagram illustrating an example of a BSR transmission sequence in the wireless communication system 1 according to Example 3. In the example illustrated in FIG. 9, the terminal 10 allocates a part of an allocation amount indicated in uplink grant to be used for BSR transmission when the uplink grant is received from the base station 20 and UL data is transmitted, in the same manner as in Example 2. However, in a case where a status of the transmission buffer satisfies a predetermined condition, the terminal 10 according to Example 3 allocates a part of an allocation amount indicated in uplink grant to be used for BSR transmission. For example, in a case where a status of the transmission buffer does not satisfy a predetermined condition, the terminal 10 according to Example 3 may not allocate a part of an allocation amount indicated in uplink grant to be used for BSR transmission. The determination of whether or not a status of the transmission buffer satisfies a predetermined condition in the terminal 10 helps to indirectly determine whether or not estimation accuracy of a buffer estimation amount of the terminal 10 in the base station 20 deteriorates.

In FIG. 9, an initial buffer size of the terminal 10 is "6000 bytes". In the same manner as in the example illustrated in FIG. 6, the terminal 10 performs first BSR transmission, and receives uplink grant (allocation amount: 5000 bytes) from the base station 20. In this case, the terminal 10 compares a buffer size of the transmission buffer after the previous transmission of UL data with the current buffer size. In the example illustrated in FIG. 9, a comparison result does not satisfy a predetermined condition, and thus the terminal 10 does not allocate a part of an allocation amount indicated in the uplink grant to be used for BSR transmission. For example, UL data (length of 5000 bytes) with a data length corresponding to the allocation amount (length of 5000 bytes) is transmitted to the base station 20. As a result, a buffer size of the transmission buffer of the terminal 10 becomes "1000 bytes", and a buffer estimation amount of the terminal 10 in the base station 20 is "0 bytes<BS<=1074 bytes".

In scheduling for the terminal 10, the base station 20 determines, for example, "1074 bytes" as an allocation amount of a wireless resource to the terminal 10 based on the range "0 bytes<BS<=1074 bytes" indicated by the buffer estimation amount after being updated. The base station 20 transmits uplink grant (allocation amount: 1074 bytes) indicating the allocation amount "1074 bytes" to the terminal 10, to the terminal 10.

The terminal 10 receives the uplink grant (allocation amount: 1074 bytes) from the base station 20, and compares a buffer size of the transmission buffer after the previous transmission of UL data with the current buffer size. In the example illustrated in FIG. 9, new UL data (length of 5000 bytes) is added to the transmission buffer of the terminal 10 before the uplink grant (allocation amount: 1074 bytes) is received.

The terminal 10 converts the buffer size "1000 bytes" of the buffer size of the transmission buffer after the previous transmission of UL data into a BSR index according to the BSR buffer index table exemplified in FIG. 2. As a result, the BSR index "24" is acquired. The terminal 10 converts the current size "6000 bytes" of the transmission buffer into a BSR index according to the BSR buffer index table exemplified in FIG. 2. As a result, the BSR index "32" is acquired.

The terminal 10 compares the BSR index corresponding to the buffer size after the previous transmission of UL data with the BSR index corresponding to the current buffer size. As a result, since both of the BSR indexes are different from each other, the terminal 10 determines that there is a variation of the buffer size corresponding to the difference between the BSR indexes. For example, the BSR index corresponding to the buffer size after the previous transmission of UL data corresponds to a status of the transmission buffer of the terminal 10 recognized by the base station 20. Thus, in the comparison, a difference between both of the BSR indexes may indicate that estimation accuracy of a buffer estimation amount of the terminal 10 in the base station 20 deteriorates.

In FIG. 9, since the BSR index corresponding to the buffer size after the previous transmission of UL data is different the BSR index corresponding to the current buffer size, the terminal 10 allocates a part of the allocation amount to BSR transmission. For example, an allocation amount to BSR transmission may be 3 bytes. Alternatively, an allocation amount to BSR transmission may be 2 bytes or the like. Such values are only examples.

The terminal 10 extracts data corresponding to the residual allocation amount "1071 bytes" in a case where 3 bytes is allocated to BSR transmission, from the transmission buffer. Consequently, a buffer size after data extraction becomes "4929 bytes". The terminal 10 converts the latest buffer size according to the example of the BSR index table illustrated in FIG. 2, so as to acquire the latest BSR index. For example, the terminal 10 acquires the BSR index "31" corresponding to the small range "4017<BS<=4940" including the latest buffer size "4929 bytes".

The terminal 10 transmits a BSR (New BSR) having data (UL Data) with a data length corresponding to the residual allocation amount and the latest BSR index to the base station 20 by using the allocated wireless resource. In the example illustrated in FIG. 6, the terminal 10 transmits the BSR (New BSR) having the data (UL Data: length of 1071 bytes) and the BSR index "31" to the base station 20.

The base station 20 receives the BSR (New BSR) having the data (UL Data: length of 1071 bytes) and the BSR index "31" from the terminal 10. The base station 20 converts the latest BSR index "31" according to the BSR index table, so as to acquire a buffer estimation amount "4017<BS<=4940" of the terminal 10. Consequently, the base station may update the buffer estimation amount of the terminal 10 based on the latest BSR (New BSR) whenever data is received from the terminal 10. As a result, in the example illustrated in FIG. 9, the base station 20 may continuously perform scheduling of a wireless resource for the terminal 10, and the terminal 10 may be appropriately allocated with a wireless resource.

The above description relates to an example of the BSR transmission sequence in the wireless communication system 1 according to Example 3. According to Example 3, the terminal 10 determines whether or not a BSR index corresponding to a buffer size after the previous transmission of UL data is different from a BSR index corresponding to the current buffer size. In a case where both of the BSR indexes are different from each other, there is a probability that estimation accuracy of a buffer estimation amount of the terminal 10 in the base station 20 may deteriorate, and thus a part of an allocation amount is allocated to BSR transmission. Consequently, in a case where it is determined that estimation accuracy of a buffer estimation amount in the base station 20 does not deteriorate, BSR transmission is omitted, and thus a wireless resource may be effectively used for other applications such as UL data transmission. On the other hand, according to the method, in a case where the terminal 10 detects that estimation accuracy of a buffer estimation amount of the terminal 10 in the base station 20 deteriorates, the terminal allocates a part of the allocation amount to BSR transmission, and thus enables a buffer estimation amount estimated in the base station 20 to track a variation of a buffer status of the terminal 10. As a result, it is expected that the base station 20 recognizes which terminal requires to what extent of wireless resource, and thus performs appropriate scheduling. For example, the terminal 10 may be appropriately allocated with a wireless resource.

In FIG. 9, a description has been made of an example in which new data is added before uplink grant is received from the base station 20, but Example 3 is not limited thereto. For example, in the same manner as in the example illustrated in FIG. 4, it is noted that Example 2 may also be applied to a case where some data in the transmission buffer is discarded before uplink grant is received from the base station 20.

Figure 10:
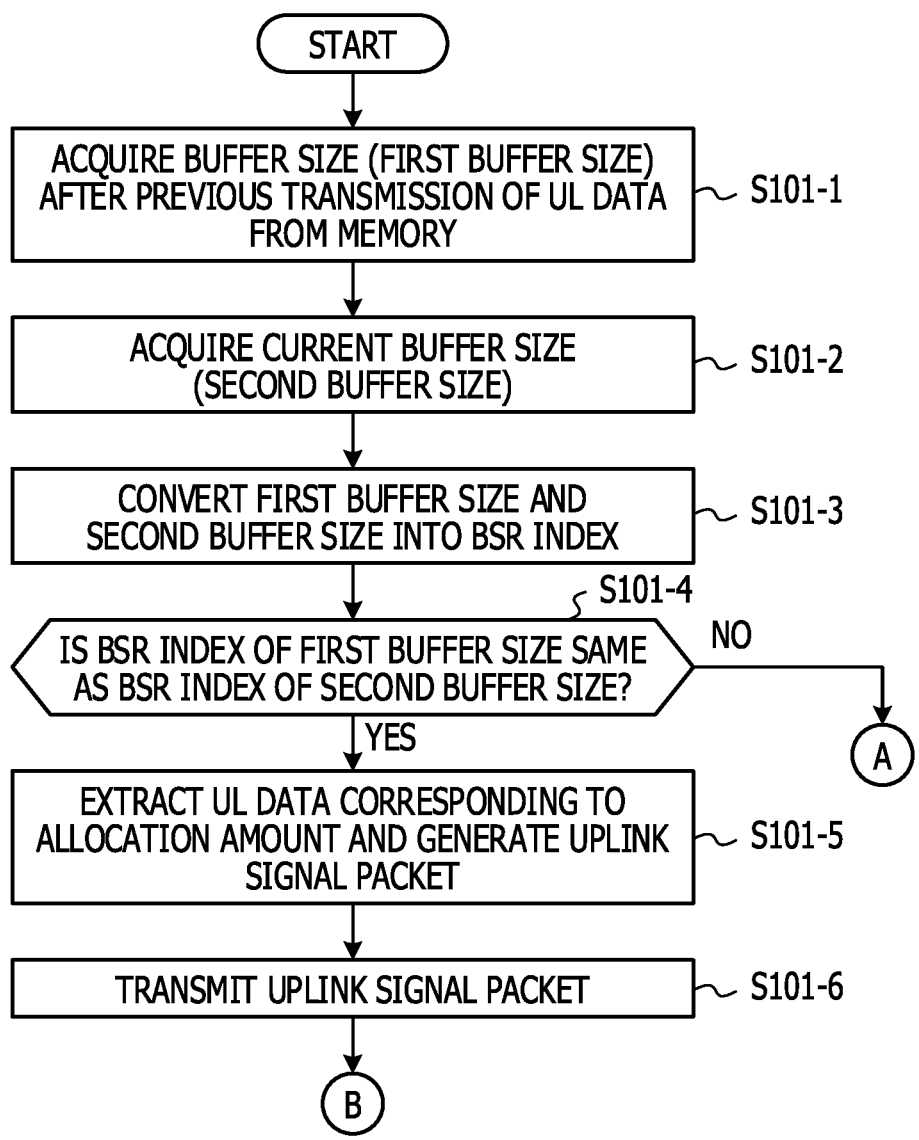
FIG. 10 is a diagram (first) illustrating an example of a flow of a process in a terminal according to Example 3.
Figure 11:
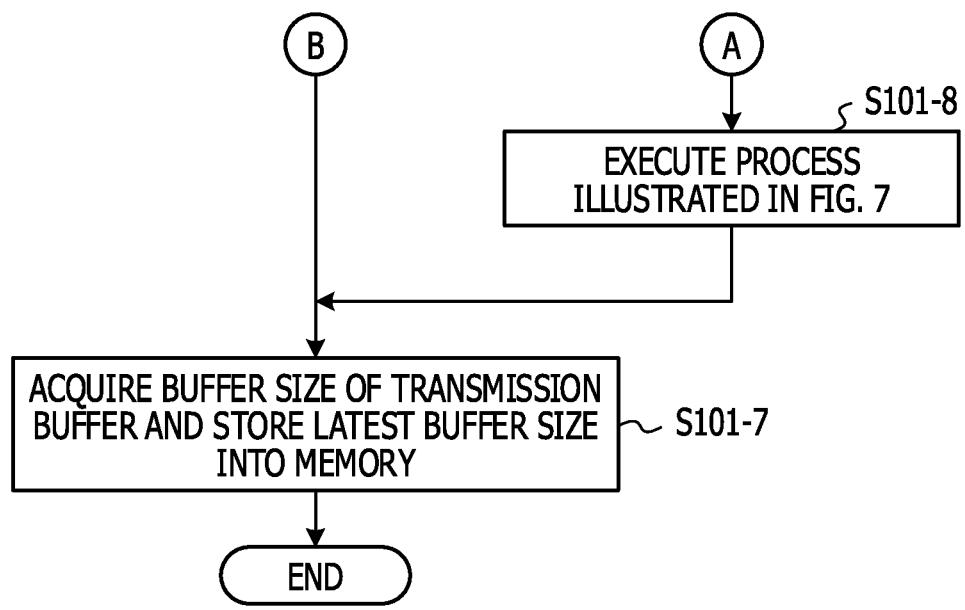
FIG. 11 is a diagram (second) illustrating an example of a flow of a process in a terminal according to Example 3.

FIGS. 10 and 11 are diagrams illustrating an example of a flow of a process in the terminal 10 according to Example 3. For example, the terminal 10 may execute the flow of the process illustrated in FIGS. 10 and 11 in response to reception of uplink grant (UL grant) indicating an allocation amount of a wireless resource for UL data transmission from the base station 20.

The terminal 10 acquires a buffer size (also referred to as a first buffer size) after the previous transmission of UL data from a memory of the terminal 10 (S101-1). A buffer size of the transmission buffer is stored in the memory of the terminal 10 whenever process S101-7 which will be described later is executed. A value of 0 may be stored when process S101-1 is executed for the first time. Alternatively, the current buffer size of the transmission buffer may be used as the first buffer size when process S101-1 is executed for the first time. The terminal 10 may reset a determination reference for whether or not process S101-1 is executed for the first time, for example, whenever a scheduling request is transmitted to the base station 20. Alternatively, the terminal 10 may reset a determination reference for whether or not process S101-1 is executed for the first time, for example, whenever a pause state (also referred to as an idle state) is finished.

The terminal 10 acquires the current buffer size (also referred to as a second buffer size) (S101-2).

The terminal 10 converts the first buffer size and the second buffer size into BSR indexes according to the BSR index table (S101-3).

The terminal 10 compares the BSR index of the first buffer size with the BSR index of the second buffer size, and determines whether or not the BSR index of the first buffer size is the same as the BSR index of the second buffer size (S101-4). In the process S101-4, determining whether or not the BSR index of the first buffer size is the same as the BSR index of the second buffer size has an aspect of determining whether or not a part of an allocation amount indicated in uplink grant is to be allocated to BSR transmission. For example, in a case where the BSR index of the first buffer size is the same as the BSR index of the second buffer size, the terminal 10 does not allocate a part of the allocation amount to BSR transmission in a process which will be described later. On the other hand, in a case where the BSR index of the first buffer size is not the same as the BSR index of the second buffer size, the terminal 10 allocates a part of the allocation amount to BSR transmission in the process which will be described later.

For example, in a case where the BSR index of the first buffer size is the same as the BSR index of the second buffer size (YES in S101-4), the terminal 10 extracts UL data corresponding to the allocation amount indicated in the uplink grant from the transmission buffer, and generates an uplink signal packet based on the extracted UL data (S101-5).

The terminal 10 transmits the uplink signal packet generated in process S101-5 (S101-6). In process S101-6, the terminal 10 may add a signal series based on a predetermined algorithm to the uplink signal packet when the uplink signal packet is forwarded to a lower layer on a protocol stack. An example of the signal series may include codes (also referred to as error correction code (ECC)) used to detect an error, such as CRC.

The terminal 10 acquires a buffer size of the transmission buffer, and stores the latest buffer size into the memory (S101-7). The latest buffer size stored in the memory in process S101-7 is referred to as the first buffer size when the next process S101-1 is executed.

On the other hand, in a case where the BSR index of the first buffer size is different from the BSR index of the second buffer size in process S101-4 (NO in S101-4), the terminal 10 executes the flow of the process according to Example 2 illustrated in FIG. 7 (S101-8). For example, the terminal 10 allocates a part of the allocation amount indicated in the uplink grant to BSR transmission, and transmits a packet in which the latest BSR is coupled to the uplink signal packet generated based on UL data corresponding to a residual allocation amount, to the base station 20. Consequently, the base station 20 may estimate a buffer estimation amount of the terminal 10 based on the latest BSR.

Even in a case where a part of the allocation amount is allocated to BSR transmission, the terminal 10 acquires a buffer size of the transmission buffer, and stores the latest buffer size into the memory (S101-7). Also in this case, the latest buffer size stored in the memory in process S101-7 is referred to as the first buffer size when the next process S101-1 is executed.

Figure 12:
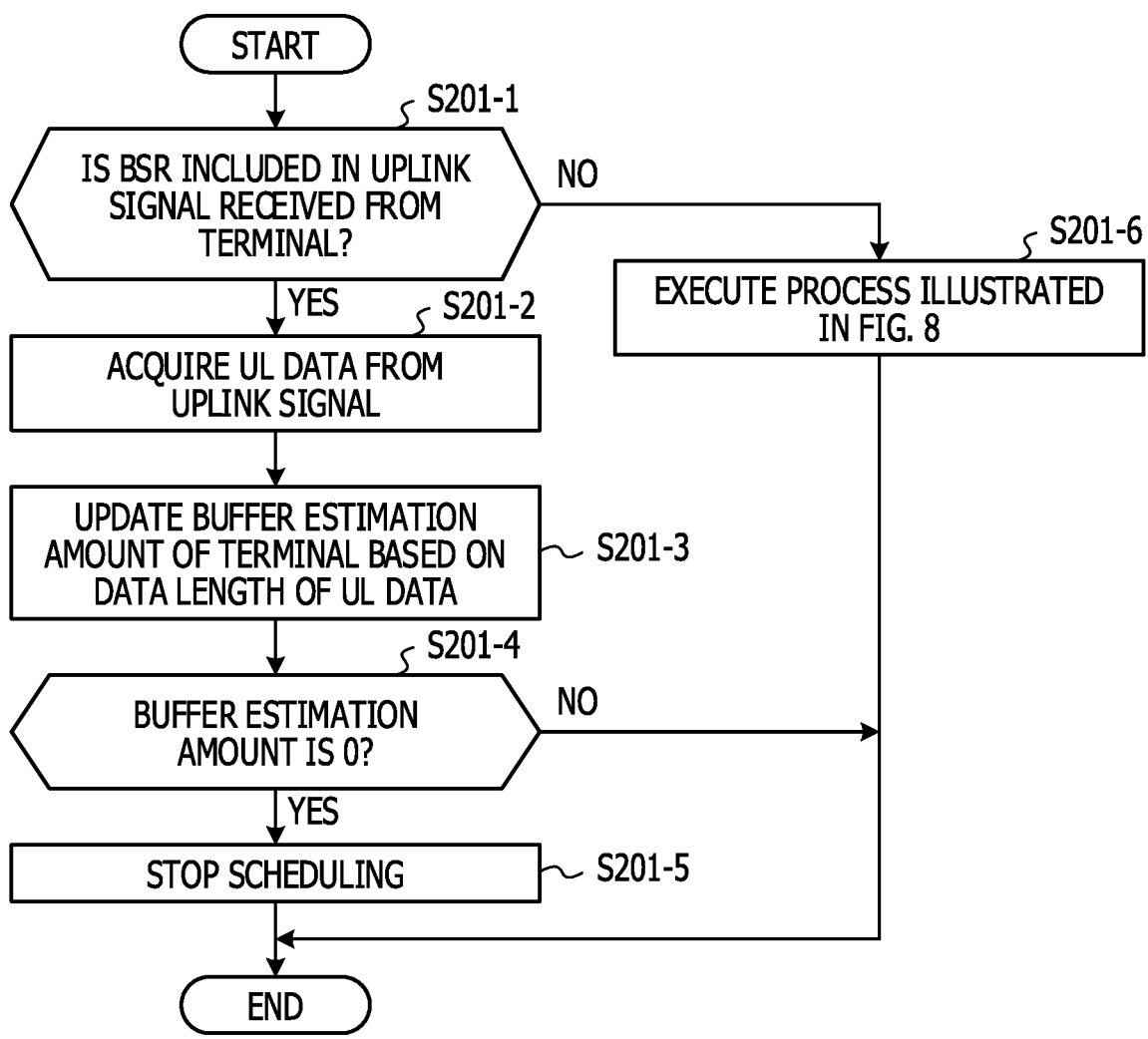
FIG. 12 is a diagram illustrating an example of a flow of a process in a base station according to Example 3.

The above description relates to an example of the flow of the process in the terminal 10 according to Example 3. Next, a description will be made of an example of a flow of a process in the base station 20 according to Example 3. FIG. 12 is a diagram illustrating an example of a flow of a process in the base station according to Example 3. For example, the base station 20 may execute the flow of the process illustrated in FIG. 12 in response to reception of an uplink signal from the terminal 10.

The base station 20 determines whether or not a BSR is included in an uplink signal received from the terminal 10 (S201-1). In process S201-1, the base station 20 may determine whether or not there is an information element storing the BSR by referring to identifiers respectively associated with a plurality of information elements included in the uplink signal. An example of an identifier associated with an information element may include a logical channel identifier (LCID). For example, according to NPL 5 (3GPP TS 36.321 V14. 2.0 (2017-03)), an LCID indicating a short-BSR is "11101", and an LCID indicating a long-BSR is "11110". It is noted that such values are only examples, and may be changed due to a future specification change.

In a case where an information element associated with an LCID indicating the BSR is not detected from the uplink signal from the terminal 10, the base station 20 may determine that the BSR is not included. In a case where it is determined that the BSR is not included in the uplink signal (YES in S201-1), the base station 20 acquires UL data from the uplink signal (S201-2), and updates a buffer estimation amount of the terminal based on a data length of the UL data (S201-3).

In a case where the buffer estimation amount after being updated is 0 (YES in S201-4), the base station 20 may stop scheduling of a wireless resource for the terminal 10 (S201-5). On the other hand, in a case where the buffer estimation amount after being updated is not 0 (NO in S201-4), the base station 20 may continuously perform scheduling of a wireless resource for the terminal 10.

In the process S201-1, in a case where it is determined that the BSR is included in the uplink signal from the terminal (NO in S201-1), the base station 20 may execute the process in the base station 20 according to Example 2 illustrated in FIG. 8 (S201-6). For example, the base station 20 extracts UL data and the BSR from the uplink signal from the terminal 10, and updates the buffer estimation amount of the terminal 10 based on a BSR index indicated in the latest BSR.

The above description relates to an example of the flow of the process in the base station 20 according to Example 3. According to Example 3, the terminal 10 determines whether or not a BSR index corresponding to a buffer size after the previous transmission of UL data is different from a BSR index corresponding to the current buffer size. In a case where both of the BSR indexes are different from each other, there is a probability that estimation accuracy of a buffer estimation amount of the terminal 10 in the base station 20 may deteriorate, and thus a part of an allocation amount is allocated to BSR transmission. Consequently, in a case where it is determined that estimation accuracy of a buffer estimation amount in the base station 20 does not deteriorate, BSR transmission is omitted, and thus a wireless resource may be effectively used for other applications such as UL data transmission. On the other hand, according to the method, in a case where the terminal 10 detects that estimation accuracy of a buffer estimation amount of the terminal 10 in the base station 20 deteriorates, the terminal allocates a part of the allocation amount to BSR transmission, and thus enables a buffer estimation amount estimated in the base station 20 to track a variation of a buffer status of the terminal 10. As a result, it is expected that the base station 20 recognizes which terminal requires to what extent of wireless resource, and thus performs appropriate scheduling. For example, the terminal 10 may be appropriately allocated with a wireless resource.

Example 4

Figure 13:
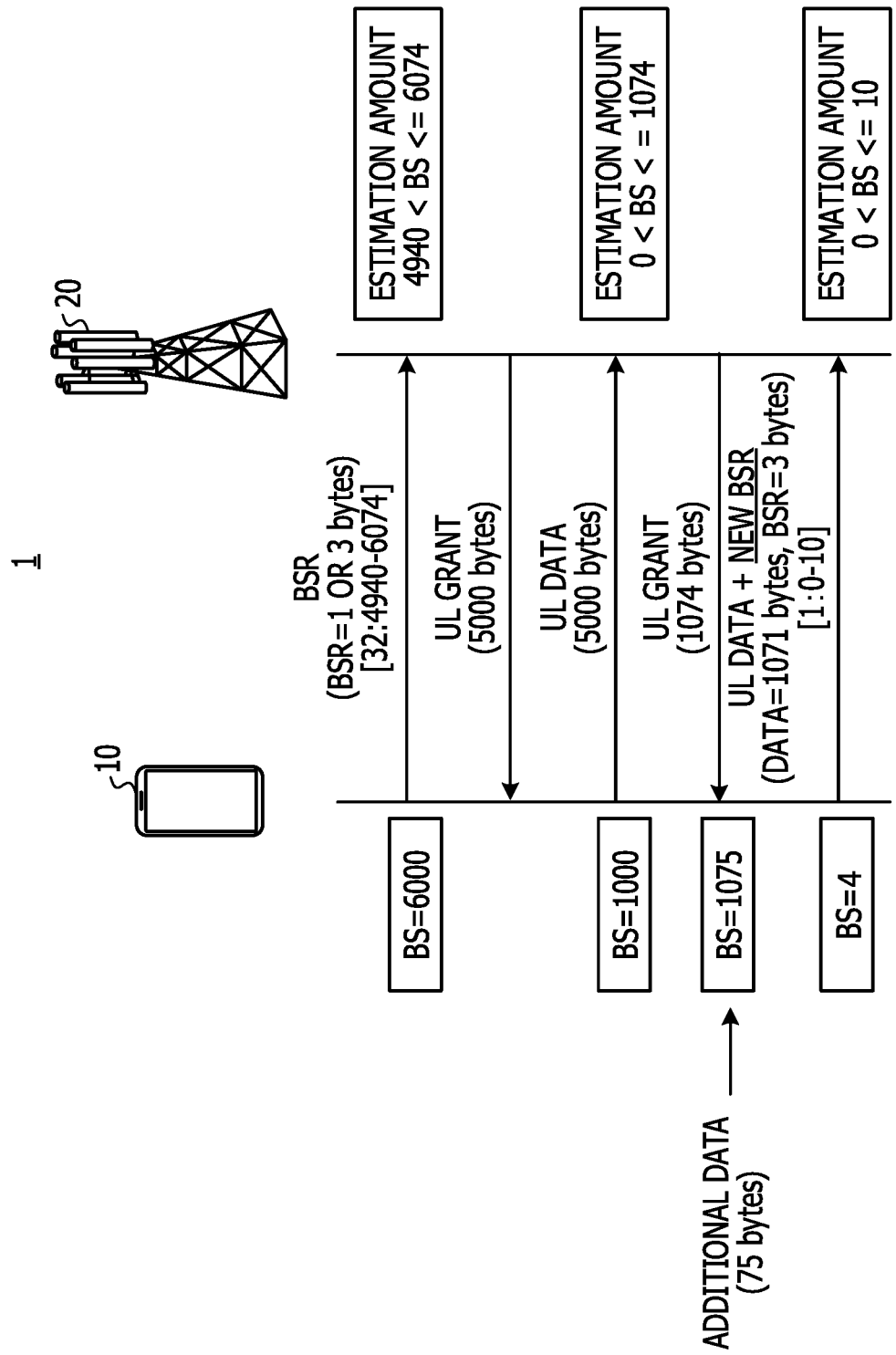
FIG. 13 is a diagram illustrating an example of a BSR transmission sequence in a wireless communication system according to Example 4.

FIG. 13 is a diagram illustrating an example of a BSR transmission sequence in the wireless communication system 1 according to Example 4. In the example illustrated in FIG. 13, in the same manner as in Example 2, the terminal 10 allocates a part of an allocation amount indicated in uplink grant to be used for BSR transmission when the uplink grant is received from the base station 20 and data is transmitted. However, in a case where a status of the transmission buffer satisfies a predetermined condition, the terminal 10 according to Example 4 allocates a part of an allocation amount indicated in uplink grant to be used for BSR transmission. For example, in a case where a status of the transmission buffer does not satisfy a predetermined condition, the terminal 10 according to Example 4 may not allocate a part of an allocation amount indicated in uplink grant to be used for BSR transmission. The determination of whether or not a status of the transmission buffer satisfies a predetermined condition in the terminal 10 helps to indirectly determine whether or not estimation accuracy of a buffer estimation amount of the terminal 10 in the base station 20 deteriorates.

In the same manner as in the example illustrated in FIG. 6, the terminal 10 receives uplink grant (allocation amount: 5000 bytes) from the base station 20. In this case, the terminal 10 compares a buffer size of the transmission buffer after the previous transmission of UL data with the current buffer size. In the example illustrated in FIG. 13, a comparison result does not satisfy a predetermined condition, and thus the terminal 10 does not allocate a part of an allocation amount indicated in the uplink grant to be used for BSR transmission. For example, UL data (length of 5000 bytes) with a data length corresponding to the allocation amount (length of 5000 bytes) is transmitted to the base station 20. As a result, a buffer size of the transmission buffer of the terminal 10 becomes "1000 bytes", and a buffer estimation amount of the terminal 10 in the base station 20 is "0 bytes<BS<=1074 bytes".

In scheduling for the terminal 10, the base station 20 determines, for example, "1074 bytes" as an allocation amount of a wireless resource to the terminal 10 based on the range "0 bytes<BS<=1074 bytes" indicated by the buffer estimation amount after being updated. The base station 20 transmits uplink grant (allocation amount: 1074 bytes) indicating the allocation amount "1074 bytes" to the terminal 10, to the terminal 10.

The terminal 10 receives the uplink grant (allocation amount: 1074 bytes) from the base station 20, and acquires a buffer size (third buffer size) obtained by subtracting the allocation amount indicated in the uplink grant from the current buffer size. The terminal 10 determines whether or not the third buffer size is equal to or more than 1 byte, and is less than a predetermined threshold value. In the example illustrated in FIG. 13, new UL data (length of 75 bytes) is added to the transmission buffer of the terminal 10 before the uplink grant (allocation amount: 1074 bytes) is received.

In FIG. 13, the terminal 10 acquires the third buffer size "1 byte" by subtracting the allocation amount "1074 bytes" indicated in the uplink grant from the current buffer size "1075 bytes". As a result, the terminal 10 determines that the third buffer size satisfies the predetermined condition, and thus allocates a part of the allocation amount indicated in the uplink grant to BSR transmission. In the example illustrated in FIG. 13, the terminal 10 allocates 3 bytes to BSR transmission as an example.

The terminal 10 extracts data corresponding to the residual allocation amount "1071 bytes" in a case where 3 bytes is allocated to BSR transmission, from the transmission buffer. Consequently, a buffer size after data extraction becomes "4 bytes". The terminal 10 converts the latest buffer size according to the example of the BSR index table illustrated in FIG. 2, so as to acquire the latest BSR index. For example, the terminal 10 acquires the BSR index "1" corresponding to the small range "0<BS<=10" including the latest buffer size "4 bytes".

The terminal 10 transmits a BSR (New BSR) having data (UL Data) with a data length corresponding to the residual allocation amount and the latest BSR index to the base station 20 by using the allocated wireless resource. In the example illustrated in FIG. 13, the terminal 10 transmits the BSR (New BSR) having the data (UL Data: length of 1071 bytes) and the BSR index "1" to the base station 20.

The base station 20 receives the BSR (New BSR) having the data (UL Data: length of 1071 bytes) and the latest BSR index "1" from the terminal 10. The base station 20 converts the latest BSR index "1" according to the BSR index table, so as to acquire a buffer estimation amount "0<BS<=10" of the terminal 10. Consequently, the base station may update the buffer estimation amount of the terminal 10 based on the latest BSR (New BSR) whenever data is received from the terminal 10. As a result, in the example illustrated in FIG. 13, the base station 20 may continuously perform scheduling of a wireless resource for the terminal 10, and the terminal 10 may be appropriately allocated with a wireless resource.

The above description relates to an example of the BSR transmission sequence in the wireless communication system 1 according to Example 4. According to Example 4, the terminal 10 estimates a buffer size (also referred to as a third buffer size) after UL data corresponding to an allocation amount from the base station 20 is transmitted. In a case where the third buffer size estimated by the terminal is less than a predetermined threshold value, there is a high probability that a buffer estimation amount of the terminal 10 in the base station 20 may be 0, and thus a part of the allocation amount is allocated to BSR transmission. For example, in a case where the third buffer size is less than the predetermined threshold value, there is a high probability that the base station 20 may stop scheduling of a wireless resource for the terminal 10. The threshold value may be set as appropriate according to the extent of allowable deterioration in estimation accuracy in the base station. FIG. 13 illustrates an example in which the threshold value is set to 1000 bytes as an example of the threshold value.

In Example 4, in a case where there is not a high probability that scheduling of a wireless resource for the terminal 10 may not be stopped due to a buffer estimation amount in the base station 20, BSR transmission is omitted, and thus a wireless resource may be effectively used for other applications such as UL data transmission. On the other hand, according to the method, in a case where the terminal 10 detects that there is a probability that scheduling of a wireless resource for the terminal 10 may be stopped despite UL data remaining in the transmission buffer, the terminal allocates a part of the allocation amount to BSR transmission, and thus enables a buffer estimation amount estimated in the base station 20 to track a variation of a buffer status of the terminal 10. As a result, it is expected that the base station 20 recognizes which terminal requires to what extent of wireless resource, and thus performs appropriate scheduling. For example, the terminal 10 may be appropriately allocated with a wireless resource.

In FIG. 13, a description has been made of an example in which new data is added before uplink grant is received from the base station 20, but Example 4 is not limited thereto. For example, in the same manner as in the example illustrated in FIG. 4, it is noted that Example 2 may also be applied to a case where some data in the transmission buffer is discarded before uplink grant is received from the base station 20.

Figure 14:
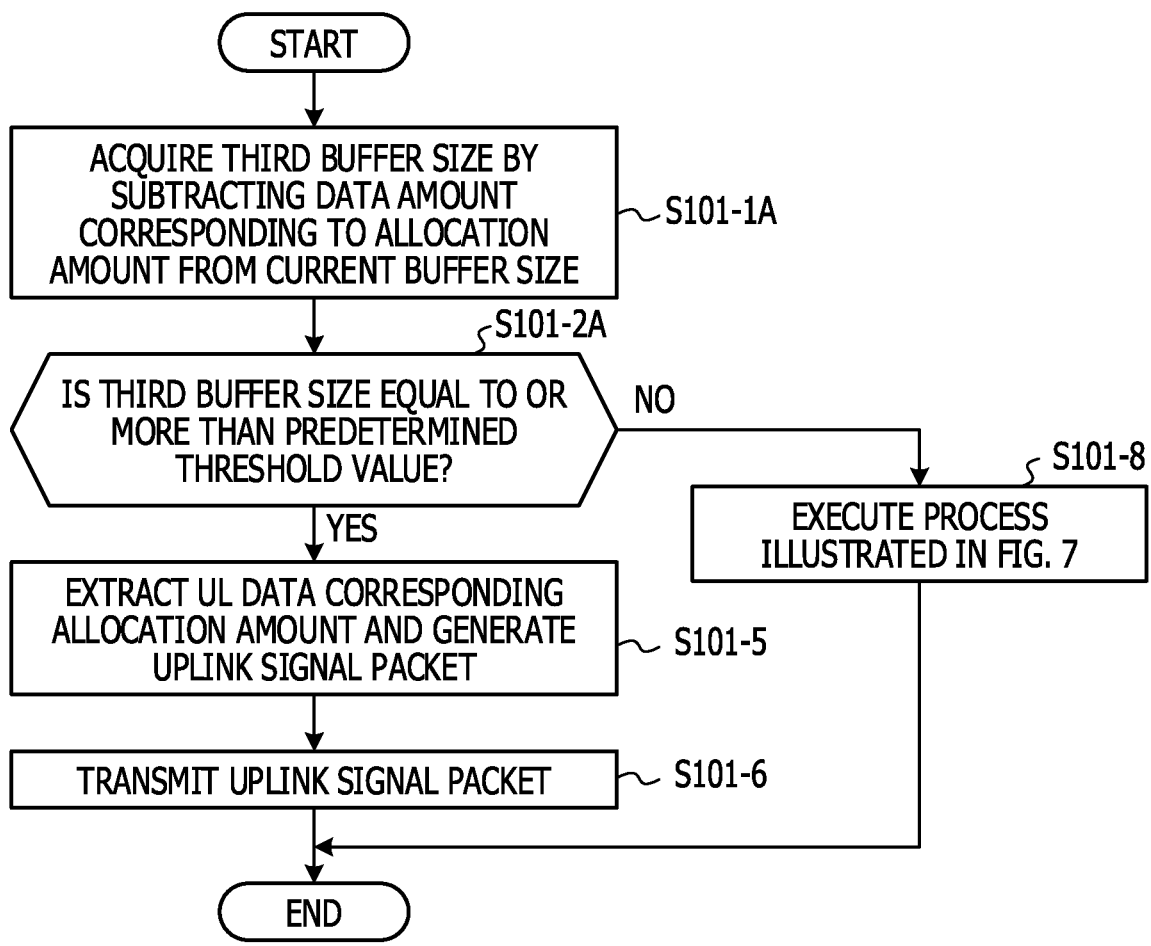
FIG. 14 is a diagram illustrating an example of a flow of a process in a terminal according to Example 4.

FIG. 14 is a diagram illustrating an example of a flow of a process in the terminal 10 according to Example 4. For example, the terminal 10 may execute the flow of the process illustrated in FIG. 14 in response to reception of uplink grant (UL grant) from the base station 20.

The terminal 10 acquires the third buffer size by subtracting a data amount corresponding to an allocation amount indicated in the uplink grant from the current buffer size of the transmission buffer (S101-1A).

The terminal 10 determines whether or not the third buffer size acquired in process S101-1A is equal to or more than a predetermined threshold value (S101-2A). The predetermined threshold value may be recorded in advance in a memory during manufacturing of the terminal 10, and may be set based on a signal received from the base station 20. An example of the signal may include an RRC connection reconfiguration message that is a kind of RRC message. The RRC connection reconfiguration message is an RRC message transmitted to the terminal 10 from the base station 20, for example, when a wireless communication link is established (reestablished) between the terminal 10 and the base station 20.

In a case where it is determined that the third buffer size is equal to or more than the predetermined threshold value (YES in S101-2A), the terminal 10 extracts UL data corresponding to the allocation amount from the transmission buffer, and generates an uplink signal packet (S101-5). The uplink signal packet generated in process S101-5 is transmitted (S101-6). In process S101-6, the terminal 10 may add a signal series based on a predetermined algorithm to the uplink signal packet when the uplink signal packet is forwarded to a lower layer on a protocol stack. An example of the signal series may include codes (also referred to as error correction code (ECC)) used to detect an error, such as CRC.

On the other hand, in a case where the third buffer size is less than the predetermined threshold value in process S101-2A (NO in S101-2A), the terminal 10 executes the flow of the process according to Example 2 illustrated in FIG. 7 (S101-8). For example, the terminal 10 allocates a part of the allocation amount indicated in the uplink grant to BSR transmission, and transmits a packet in which the latest BSR is coupled to the uplink signal packet generated based on UL data corresponding to a residual allocation amount, to the base station 20. Consequently, the base station 20 may estimate a buffer estimation amount of the terminal 10 based on the latest BSR.

The above description relates to an example of the flow of the process in the terminal 10 according to Example 4. A flow of a process in the base station 20 according to Example 4 is the same as that in Example 3, and thus a description thereof will be omitted.

Example 5

Figure 15:
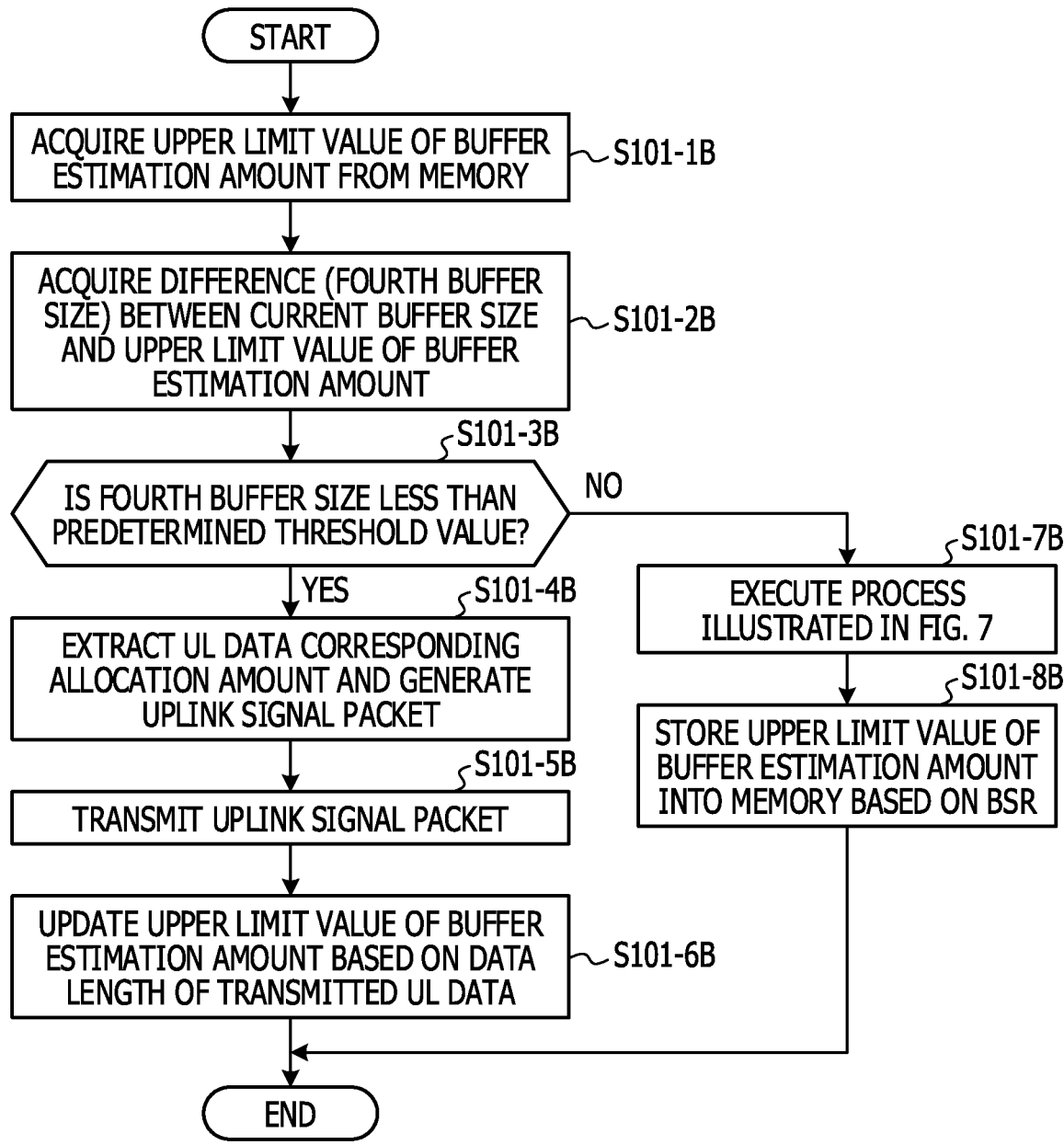
FIG. 15 is a diagram illustrating an example of a flow of a process in a terminal according to Example 5.

FIG. 15 is a diagram illustrating an example of a flow of a process in the terminal 10 according to Example 5. In the same manner as in the terminal 10 according to Example 3, in a case where a status of the transmission buffer satisfies a predetermined condition, the terminal 10 according to Example 5 allocates a part of an allocation amount indicated in uplink grant to be used for BSR transmission. For example, in a case where a status of the transmission buffer does not satisfy a predetermined condition, the terminal 10 according to Example 3 may not allocate a part of an allocation amount indicated in uplink grant to be used for BSR transmission. The determination of whether or not a status of the transmission buffer satisfies a predetermined condition in the terminal 10 helps to indirectly determine whether or not estimation accuracy of a buffer estimation amount of the terminal 10 in the base station 20 deteriorates.

In Example 5, the terminal 10 performs the substantially same process as buffer estimation performed by the base station 20, and thus performs mirroring of a buffer estimation amount of the terminal 10. It is determined whether or not estimation accuracy of a buffer estimation amount of the terminal 10 in the base station 20 deteriorates based on the mirrored buffer estimation amount and the current buffer size. Hereinafter, an example of the flow of the process illustrated in FIG. 15 will be described in order.

For example, the terminal 10 according to Example 5 may execute the flow of the process illustrated in FIG. 15 in response to reception of uplink grant (UL grant) from the base station 20.

The terminal 10 acquires an upper limit value of a buffer estimation amount from the memory (S101-113). An upper limit value of a buffer estimation amount is stored in the memory of the terminal 10 whenever process S101-8B which will be described later is executed. The upper limit value of the buffer estimation amount is updated whenever process S101-6B which will be described later is executed. A value of 0 may be stored when process S101-1B is executed for the first time.

The terminal 10 acquires a difference (fourth buffer size) between the current buffer size and the upper limit value of the buffer estimation amount acquired in process S101-1B (S101-213).

The terminal 10 determines whether or not the fourth buffer size is less than a predetermined threshold value (S101-313). The predetermined threshold value may be recorded in advance in a memory during manufacturing of the terminal 10, and may be set based on a signal received from the base station 20. An example of the signal may include an RRC connection reconfiguration message that is a kind of RRC message. The RRC connection reconfiguration message is an RRC message transmitted to the terminal 10 from the base station 20, for example, when a wireless communication link is established (reestablished) between the terminal 10 and the base station 20. For example, the threshold value may be set to 1000 bytes.

In the process S101-2B, determining whether or not the fourth buffer size is less than the predetermined threshold value has an aspect of determining whether or not a part of an allocation amount indicated in uplink grant is to be allocated to BSR transmission. For example, in a case where it is determined that the fourth buffer size is less than the threshold value, the terminal 10 does not allocate a part of the allocation amount to BSR transmission in a process which will be described later. On the other hand, in a case where it is determined that the fourth buffer size is equal to or more than the threshold value, the terminal 10 allocates a part of the allocation amount to BSR transmission in the process which will be described later.

For example, in a case where it is determined that the fourth buffer size is equal to or more than the predetermined threshold value (YES in S101-3B), the terminal 10 extracts UL data corresponding to the allocation amount from the transmission buffer, and generates an uplink signal packet (S101-4B). The terminal 10 transmits the uplink signal packet generated in process S101-4B (S101-5B). In process S101-5B, the terminal 10 may add a signal series based on a predetermined algorithm to the uplink signal packet when the uplink signal packet is forwarded to a lower layer on a protocol stack. An example of the signal series may include codes (also referred to as error correction code (ECC)) used to detect an error, such as CRC.

The terminal 10 updates the upper limit value of the buffer estimation amount based on a data length of the transmitted UL data (S101-6B). In process S101-6B, the terminal 10 may update the upper limit value of the buffer estimation amount by subtracting the data length of the UL data transmitted in process S101-5B from the upper limit value of the buffer estimation amount acquired from the memory in process S101-1B. The upper limit value of the buffer estimation amount after being updated is stored in the memory. In process S101-6B, the data length of the UL data transmitted in process S101-5B has an aspect in which the data length may correspond to a data length of the UL data extracted from the transmission buffer in process S101-4B. For example, in process S101-6B, the upper limit value of the buffer estimation amount may be updated based on the allocation amount indicated in the uplink grant from the base station 20.

In process S101-6B, in a case where the upper limit value after being updated is a negative value, the terminal 10 may set the upper limit value of the buffer estimation amount after being updated to 0.

In a case where it is determined that the fourth buffer size is equal to or more than the threshold value in process S101-3B (NO in S101-3B), the terminal 10 executes the flow of the process according to Example 2 illustrated in FIG. 7 (S101-7B). For example, the terminal 10 allocates a part of the allocation amount indicated in the uplink grant to BSR transmission, and transmits a packet in which the latest BSR is coupled to the uplink signal packet generated based on UL data corresponding to a residual allocation amount, to the base station 20. Consequently, the base station 20 may estimate a buffer estimation amount of the terminal 10 based on the latest BSR.

The terminal 10 stores the upper limit value of the buffer estimation amount into the memory based on the latest BSR (S101-8B). In process S101-8B, the terminal 10 converts a BSR index indicated in the latest BSR transmitted to the base station in process S101-7B into a buffer estimation amount according to the BSR index table exemplified in FIG. 2. For example, the BSR index value "32" is converted into a buffer estimation amount having the lower limit value "4940 bytes" and the upper limit value "6074 bytes" according to the BSR index table exemplified in FIG. 2. According to this example, the terminal 10 stores the upper limit value "6074 bytes" of the buffer estimation amount into the memory. Consequently, in process S101-1B, the terminal 10 may acquire the upper limit value of the buffer estimation amount from the memory. The terminal 10 may perform only BSR transmission in a sequence of UL data transmission to the base station. In this case, process S101-8B may be executed such that an upper limit value of a buffer estimation amount estimated based on the BSR is stored into the memory.

The above description relates to an example of the flow of the process in the terminal 10 according to Example 5. A flow of a process in the base station 20 according to Example 5 is the same as that in the base station 20 according to Example 3, and thus a description thereof will be omitted.

Next, with reference to FIG. 9, a description will be made of a summary of an operation in a BSR transmission sequence of the terminal 10 according to Example 5. For example, a BSR transmission sequence in Example 5 is the same as in Example 3. However, a summary of an operation in the terminal 10 slightly differs, and will thus be complementarily described.

In the sequence example illustrated in FIG. 9, first, the terminal 10 converts the buffer size "6000 bytes" into the BSR index "32" according to the BSR index table. The terminal 10 transmits a BSR having the BSR index "32" to the base station 20. In this case, the terminal 10 converts the BSR index "32" into a buffer estimation amount according to the BSR index table, and stores the upper limit value "6074 bytes" of the buffer estimation amount into the memory.

In scheduling for the terminal 10, the base station 20 determines "5000 bytes" as an allocation amount of a wireless resource to the terminal 10 based on, for example, the range "4940<BS<=6074" indicated by the buffer estimation amount. The base station 20 transmits, to the terminal 10, uplink grant (allocation amount: 5000 bytes) indicating the allocation amount "5000 bytes" to the terminal 10.

The terminal 10 receives the uplink grant from the base station 20, and acquires the fourth buffer size "74 bytes" that is a difference between the upper limit value "6074 bytes" of the buffer estimation amount stored in the memory and the current buffer size "6000 bytes" in order to determine whether or not a part of the allocation amount "5000 bytes" indicated in the uplink grant is to be allocated to BSR transmission. The terminal 10 determines whether or not the fourth buffer size "74 bytes" is less than a threshold value. As an example, the threshold value is assumed to be 1000 bytes. Since the fourth buffer size "74 bytes" is less than the threshold value "1000 bytes", the terminal 10 determines that a part of the allocation amount is not to be allocated to BSR transmission.

The terminal 10 transmits UL data (length of 5000 bytes) with a data length corresponding to the allocation amount (length of 5000 bytes) to the base station 20. As a result, a buffer size of the transmission buffer of the terminal 10 becomes "1000 bytes", and a buffer estimation amount of the terminal 10 in the base station 20 is "0 bytes<BS<=1074 bytes". The terminal 10 stores the upper limit value (1074 bytes) of the buffer estimation amount that is updated based on the data length of the transmitted UL data into the memory in the same manner as the base station 20.

In scheduling for the terminal 10, the base station 20 determines, for example, "1074 bytes" as an allocation amount of a wireless resource to the terminal 10 based on the range "0 bytes<BS<=1074 bytes" indicated by the buffer estimation amount after being updated. The base station 20 transmits uplink grant (allocation amount: 1074 bytes) indicating the allocation amount "1074 bytes" to the terminal 10, to the terminal 10.

The terminal 10 receives the uplink grant (allocation amount: 1074 bytes) from the base station 20, and determines whether or not a part of the allocation amount is to be allocated to BSR transmission. In the example illustrated in FIG. 9, new UL data (length of 5000 bytes) is added to the transmission buffer of the terminal 10 before the uplink grant (allocation amount: 1074 bytes) is received. The terminal 10 acquires the fourth buffer size "4926 bytes" that is a difference between the upper limit value "1074 bytes" of the buffer estimation amount stored in the memory and the current buffer size "6000 bytes". The terminal 10 determines whether or not the fourth buffer size "4926 bytes" is less than the threshold value. Since the fourth buffer size "4926 bytes" is equal to or more than the threshold value "1000 bytes", the terminal 10 determines that a part of the allocation amount is to be allocated to BSR transmission. For example, the fourth buffer size being equal to or more than the threshold value may correspond to estimation accuracy of the buffer estimation amount of the terminal 10 recognized by the base station 20 deteriorating to the threshold value or greater.

In FIG. 9, when the uplink grant (allocation amount: 1074 bytes) is received from the base station 20, the terminal 10 allocates a part of the allocation amount to BSR transmission in order to improve the deterioration in estimation accuracy in the base station 20. For example, an allocation amount to BSR transmission may be 3 bytes. Alternatively, an allocation amount to BSR transmission may be 2 bytes or the like. Such values are only examples.

The terminal 10 extracts data corresponding to the residual allocation amount "1071 bytes" in a case where 3 bytes is allocated to BSR transmission, from the transmission buffer. Consequently, a buffer size after data extraction becomes "4929 bytes". The terminal 10 converts the latest buffer size according to the example of the BSR index table illustrated in FIG. 2, so as to acquire the latest BSR index. For example, the terminal 10 acquires the BSR index "31" corresponding to the small range "4017<BS<=4940" including the latest buffer size "4929 bytes".

The terminal 10 transmits a BSR (New BSR) having data (UL Data) with a data length corresponding to the residual allocation amount and the latest BSR index to the base station 20 by using the allocated wireless resource. In the example illustrated in FIG. 6, the terminal 10 transmits the BSR (New BSR) having the data (UL Data: length of 1071 bytes) and the BSR index "31" to the base station 20.

The terminal 10 updates the upper limit value of the buffer estimation amount based on the latest BSR index "31". For example, the terminal 10 converts the latest BSR index "31" into the upper limit value "4940 bytes" of the buffer estimation amount according to the BSR index table exemplified in FIG. 2. The terminal 10 stores, into the memory, the upper limit value "4940 bytes" of the buffer estimation amount acquired based on the latest BSR index "31". Consequently, in a case where the next uplink grant is received, the upper limit value "4940 bytes" of the buffer estimation amount stored in the memory is referred to in determination of whether or not a part of an allocation amount is to be allocated to BSR transmission.

In the BSR transmission sequence according to Example 5, an operation summary of the base station 20 is the same as in Example 3, and thus a description thereof will be omitted.

The above description relates to the wireless communication system 1 according to Example 5. According to Example 5, the terminal 10 performs mirroring of buffer estimation performed by the base station 20, and determines whether or not the fourth buffer size that is a difference between an upper limit value of a buffer estimation amount and the current buffer size is less than a threshold value. In a case where the fourth buffer size is equal to or more than the threshold value, there is a probability that estimation accuracy of a buffer estimation amount of the terminal 10 in the base station 20 may deteriorate, and thus a part of an allocation amount is allocated to BSR transmission. On the other hand, in a case where it is determined that estimation accuracy of a buffer estimation amount in the base station 20 does not deteriorate, the terminal 10 omits BSR transmission. Consequently, allocation of a wireless resource to wasteful BSR transmission may be reduced, and thus a wireless resource may be effectively used for other applications such as UL data transmission.

According to the method, in a case where the terminal 10 detects that estimation accuracy of a buffer estimation amount in the base station 20 deteriorates, the terminal allocates a part of the allocation amount to BSR transmission, and thus enables a buffer estimation amount estimated in the base station 20 to track a variation of a buffer status of the terminal 10. As a result, it is expected that the base station 20 recognizes which terminal requires to what extent of wireless resource, and thus performs appropriate scheduling. For example, the terminal 10 may be appropriately allocated with a wireless resource.

Modification Example 1

In Example 1 to Example 5, a description has been made of an example in which the terminal 10 transmits UL data, and then uplink grant is issued to the terminal 10 through a scheduling process in the base station 20, but an embodiment is not limited to this example. The terminal 10 related to Modification Example 1 transmits a scheduling request (also referred to as an SR) that is a signal for requesting the base station 20 to allocate a wireless resource for BSR transmission to the base station 20 before uplink grant from the base station 20 is received.

The base station 20 related to Modification Example 1 receives the scheduling request from the terminal 10, and executes a scheduling process for allocating a wireless resource for BSR transmission to the terminal 10. The base station 20 transmits uplink grant (also referred to as BSR transmission uplink grant) indicating a wireless resource (also referred to as an allocation amount) allocated to the terminal 10, to the terminal 10. In this case, regarding an allocation amount to the terminal 10, a wireless resource enabling at least BSR transmission may be allocated.

The terminal 10 related to Modification Example 1 receives the BSR transmission uplink grant from the base station, and transmits a BSR index indicating the latest buffer size to the base station 20. Thereafter, the terminal 10 receives uplink grant indicating a wireless resource (also referred to as an allocation amount) allocated to be used for UL data transmission from the base station 20, and transmits UL data with a data length corresponding to the allocation amount indicated in the uplink grant to the base station 20.

As described above, in Modification Example 1, a trigger to execute the flow of the process in the terminal 10 according to Example 1 to Example 5 may not be dependent on reception of uplink grant from the base station 20. For example, BSR transmission as illustrated in Example 1 to Example 5 may be executed with the fact that a variation of a buffer size of the transmission buffer is detected to be equal to or more than a predetermined threshold value as a trigger.

For example, Modification Example 1 is applied to Example 2, and thus the terminal 10 transmits a scheduling request for requesting the base station 20 to allocate a wireless resource for BSR transmission in a case where a variation of a buffer size of the transmission buffer is detected to be equal to or more than a predetermined threshold value.

For example, Modification Example 1 is applied to Example 3, and thus the terminal 10 determines whether or not a BSR index of the first buffer size different from a BSR index of the second buffer size in a case where a variation of a buffer size of the transmission buffer is detected. In a case where the BSR index of the first buffer size is different from the BSR index of the second buffer size, the terminal 10 transmits a scheduling request for requesting the base station 20 to allocate a wireless resource for BSR transmission.

For example, Modification Example 1 is applied to Example 4, the terminal 10 determines whether or not a buffer size after being varied is less than a predetermined threshold value in a case where a variation of the buffer size of the transmission buffer is detected. In a case where the buffer size after being varied is less than the predetermined threshold value, the terminal 10 transmits a scheduling request for requesting the base station 20 to allocate a wireless resource for BSR transmission. In a case where Modification Example 1 is applied to Example 4, an execution trigger arrives before uplink grant is received, and thus a process using an allocation amount indicated in the uplink grant is omitted.

In a case where Modification Example 1 is applied to Example 4, the terminal 10 may expect an allocation amount indicated in uplink grant, and may acquire the third buffer size based on the expected value. For example, as described in Example 5, the terminal 10 may mirror a progress of acquiring a buffer estimation amount of the terminal 10 in the base station 20, and may use an allocation amount corresponding to an upper limit value of the buffer estimation amount as an expected value.

For example, Modification Example 1 is applied to Example 5, and thus the terminal 10 acquires the fourth buffer size that is a difference between the current buffer size and an upper limit value of a buffer estimation amount, and determines whether or not the fourth buffer size is less than a threshold value, in a case where a variation of a buffer size of the transmission buffer is detected. In a case where it is determined that the fourth buffer size is equal to or more than the threshold value, the terminal 10 transmits a scheduling request for requesting the base station 20 to allocate a wireless resource for BSR transmission.

Modification Example 2

In Example 4, it is determined that a wireless resource is to be allocated to BSR transmission in a case where the third buffer size is less than a predetermined threshold value, but an embodiment is not limited thereto. For example, Modification Example 2 is applied to Example 4, and thus the terminal 10 may allocate a wireless resource to BSR transmission in a case where it is determined that the third buffer size is equal to or more than a predetermined threshold value. On the other hand, in a case where the terminal 10 may not allocate a wireless resource to BSR transmission in a case where it is determined that the third buffer size is less than the predetermined threshold value.

The third buffer size being equal to or more than the predetermined threshold value has an aspect in which an amount of data staying in the transmission buffer is in a state of being relatively large. For example, such a state may be a state in which an application generating UL data is actively operating in the terminal 10. Therefore, Modification Example 2 has an aspect in which the terminal 10 indirectly determines whether or not the application generating UL data is in a state of actively operating based on whether or not the third buffer size is equal to or more than the predetermined threshold value.

As mentioned above, in Modification Example 2, a wireless resource is allocated to BSR transmission in a case of a state in which the application generating UL data is actively operating. Consequently, the terminal 10 related to Modification Example 2 may be appropriately allocated with a wireless resource from the base station 20 based on the latest buffer size.

Modification Example 3

The wireless terminal 10 according to each of Example 1 to Example 5 may operate to switch whether or not to make a function of allocating a part of an allocation amount from the base station 20 to BSR transmission valid based on a signal from the base station 20. An example of the signal may include an RRC connection reconfiguration message that is a kind of RRC message. The RRC connection reconfiguration message is an RRC message transmitted to the terminal 10 from the base station 20, for example, when a wireless communication link is established (reestablished) between the terminal 10 and the base station 20.

For example, in a case where Modification Example 3 is applied to Example 2, for example, when a RRC connection reconfiguration message is received from the base station 20, the terminal 10 operates to switch whether or not to make a function of allocating a part of an allocation amount from the base station 20 to BSR transmission valid based on setting information included in the RRC message. For example, when setting information for making a function of allocating a part of an allocation amount from the base station 20 to BSR transmission valid is not included in a RRC connection reconfiguration message received from the base station 20, the terminal 10 may not allocate a part of the allocation amount to BSR transmission.

For example, in a case where Modification Example 3 is applied to each of Example 3 to Example 5, when setting information for making a function of allocating a part of an allocation amount from the base station 20 to BSR transmission valid is not included in a RRC connection reconfiguration message received from the base station 20, the terminal 10 may determine whether or not to allocate a part of the allocation amount to BSR transmission. As a result, the terminal 10 does not allocate a part of the allocation amount to BSR transmission.

Modification Example 4

Regarding the Examples described in the present specification, a plurality of Examples may be combined with each other, and there is no limitation to a single Example. For example, any two or more of Example 1 to Example 5 may be combined with each other. For example, the terminal 10 may selectively execute an operation according to any of Example 1 to Example 5 based on setting information from the base station 20. As a variation of an operation selected based on setting information from the base station 20, an operation according to Modification Example 1 to Modification Example 3 may be included. A signal for sending a notification of the setting information to the terminal 10 from the base station 20 may include an RRC connection reconfiguration message that is a kind of RRC message.

Figure 16:
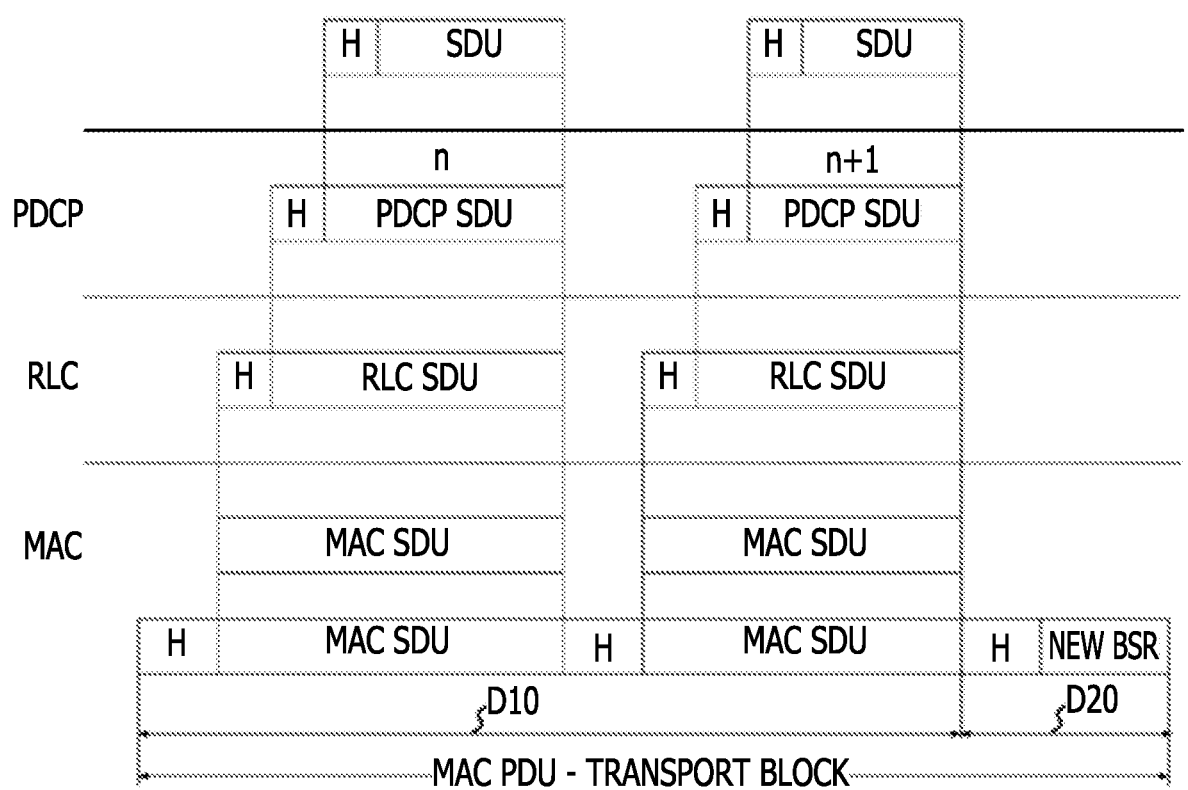
FIG. 16 is a diagram illustrating an example of a data structure of an uplink signal transmitted to the base station from the terminal in each of the Examples.

<Data Structure> FIG. 16 is a diagram illustrating an example of a data structure of the uplink signal transmitted to the base station 20 from the terminal 10 in each of the respective Examples. FIG. 16 illustrates a data structure in which a second layer (also referred to as a layer 2) is focused in a protocol stack (also referred to as a hierarchical protocol) in which a function of wireless communication is divided into a series of layers.

The second layer illustrated in FIG. 16 has three sub-layers such as Packet Convergence Protocol (PDCP), radio link control (RLC), and medium access control (MAC). However, these are only examples, and it is noted that different names may be used depending on the trend of development of specifications of the fifth generation mobile communication system.

Each layer of the terminal 10 in the wireless communication system 1 exemplified in FIG. 16 performs a process based on a predetermined protocol, such as adding of a header to a data block (service data unit (SDU)) from an upper layer, so as to generate a protocol data unit (PDU) that is the information unit exchanged between peer processors of the base station 20, and transmits the PDU to a lower layer. For example, an RLC layer of LTE uses a PDCP-PDU (that is, a data block having a PDCP header and a PDCP-SDU) that is a data block from a PDCP layer that is an upper layer, as an RLC-SDU, and performs a predetermined process of, for example, adding an RLC header to the RLC-SDU so as to generate an RLC-PDU. The RLC-PDU is transmitted to a MAC layer that is a lower layer in a state of being added with the RLC header having a sequence number (SN) in the RLC layer.

In the MAC layer of the terminal 10 exemplified in FIG. 16, the RLC-PDU from the RLC layer that is an upper layer is stored as a MAC-SDU in the transmission buffer. In a case where a part of an allocation amount included in uplink grant from the base station 20 is allocated to BSR transmission, UL data with a data length corresponding to a residual allocation amount is extracted from the transmission buffer.

In the example illustrated in FIG. 16, a data length D10 obtained by summing up two MAC-SDUs and MAC headers respectively added to the MAC-SDUs corresponds to the residual allocation amount. For example, when a MAC-SDU with a data length corresponding to a residual allocation amount is extracted from the transmission buffer, the terminal 10 may extract the MAC-SDU within a range included in the residual allocation amount from the transmission buffer by taking into consideration a data length of the MAC header added to each MAC-SDU.

In the example illustrated in FIG. 16, a data block including a MAC control element (New-BSR) having the latest BSR index and a MAC header (H) associated with the MAC control element is added to the end of the MAC-PDU generated based on the two MAC-SDUs and the like. In the example illustrated in FIG. 16, a data length D20 obtained by summing up the MAC control element and the MAC header corresponds to an allocation amount for BSR transmission.

In the example illustrated in FIG. 16, a description has been made of an example in which an allocation amount obtained by summing up the residual allocation amount D10 and the allocation amount D20 for BSR transmission is the same as a transport block size (MAC PDU-Transport Block), but an embodiment is not limited thereto. For example, in a case where an allocation amount is more than a transport block size, UL data corresponding to a residual allocation amount is divided into a plurality of MAC-PDUs so as not to exceed the transport block size. In this case, the latest BSR may be added to any one of the MAC-PDUs.

Figure 17:
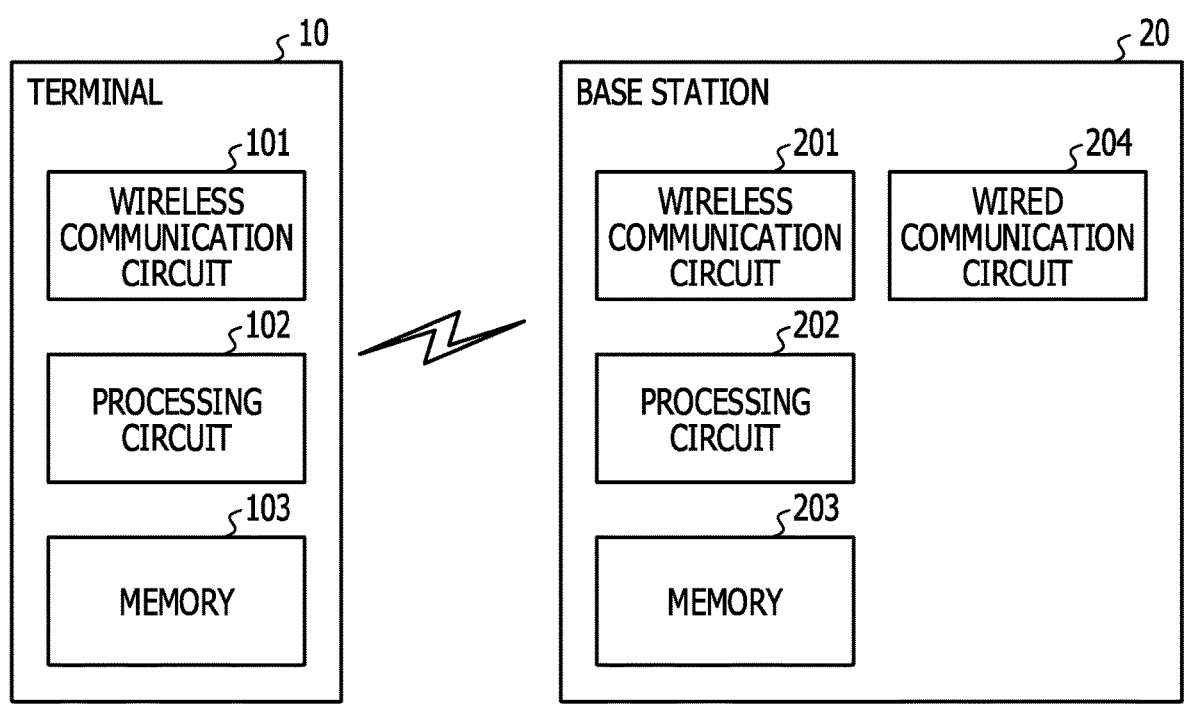
FIG. 17 is a diagram illustrating examples of hardware configurations of the terminal and the base station in the wireless communication system.

<Hardware Configuration> Finally, a hardware configuration of each apparatus used in the present example will be described briefly. FIG. 17 is a diagram illustrating examples of hardware configurations of the terminal 10 and the base station 20 in the wireless communication system 1.

The terminal 10 illustrated in FIG. 17 includes a wireless communication circuit 101, a processing circuit 102, and a memory 103. In the terminal 10 illustrated in FIG. 17, an antenna is not illustrated. The terminal 10 may be provided with a display device such as a liquid crystal display, an input device such as a touch panel, and a battery such as a lithium-ion rechargeable battery.

In a downlink, the wireless communication circuit 101 is configured to receive a baseband signal from the processing circuit 102, generate a wireless signal with a predetermined output level by using the baseband signal, and radiate the wireless signal to the space via the antenna. In an uplink, the wireless communication circuit 101 is configured to receive a wireless signal input from the antenna, convert the wireless signal into a baseband signal, and supply the baseband signal to the processing circuit 102. The wireless communication circuit 101 may be communicably coupled to the processing circuit 102 via a transmission circuit. The transmission circuit may be a transmission circuit conforming to a standard such as M-PHY or Dig-RF. As described above, the wireless communication circuit 101 has an aspect of a communication unit (also referred to as a transmission/reception unit or a first transmission/reception unit) having a function of performing wireless communication with the base station 20.

The processing circuit 102 is configured to perform baseband signal processing. In an uplink, the processing circuit 102 is configured to generate a baseband signal based on a protocol stack in a wireless communication system, and output the baseband signal to the wireless communication circuit 101. In a downlink, the processing circuit 102 is configured to perform a reception process such as demodulation or decoding on a baseband signal input from the wireless communication circuit 101 based on the protocol stack in the wireless communication system. For example, in an uplink, the processing circuit 102 has an aspect of a circuit that sequentially processes transmission data from an upper layer to a lower layer according to procedures of a protocol stack in which a wireless communication function is divided into a plurality of layers, and transmits the transmission data to the base station apparatus 20 as a reception apparatus via the wireless communication circuit 101. In a downlink, the processing circuit 102 has an aspect of a circuit that sequentially processes a wireless signal received via the wireless communication circuit 101 from a lower layer to an upper layer, according to procedures of a protocol stack in which a wireless communication function is divided into a plurality of layers. In a downlink, receiving a baseband signal from the wireless communication circuit 101 has an aspect of receiving the wireless signal from the base station apparatus 20 via the wireless communication circuit 101.

The processing circuit 102 may be, for example, a calculation device realizing an operation of the terminal 10 according to each of the various Examples by reading and executing a program stored in the memory 103. Examples of the processing circuit 102 may include a central processing unit (CPU), a micro-processing unit (MPU), a digital signal processor (DSP), and a field-programmable gate array (FPGA). The processing circuit 102 may be a multicore processor including two or more cores. Regarding the processing circuit 102, two or more processing circuits 102 may be mounted according to each layer in a protocol stack of the wireless communication system. For example, the processing circuit 102 executing a process as a MAC entity included in the MAC layer, the processing circuit 102 executing a process as an RLC entity included in the RLC layer, and the processing circuit 102 executing a process as a PDCP entity included in the PDCP layer may be separately mounted. The processing circuit 102 is also referred to as a C-CPU. The terminal apparatus 10 may be mounted with a processor circuit also referred to as an A-CPU executing an application in addition to the processing circuit 102. The processing circuit 102 may be mounted in one chip along with a processor circuit also referred to as an A-CPU, and may be mounted in separate chips. As described above, the processing circuit 102 has an aspect of a control unit (also referred to as a first control unit) having a function of controlling an operation of the terminal 10.

The memory 103 is a circuit configured to store and hold data or a program related to baseband signal processing executed by the processing circuit 102. The memory 103 is configured to include at least one both or one of a nonvolatile storage device and a volatile storage device. For example, the memory may include a random-access memory (RAM), a read-only memory (ROM), a solid state drive (SSD), and a hard disk drive (HDD). In FIG. 17, the memory 103 is the generic name of various storage devices such as main storage devices and auxiliary storage devices. Regarding the memory 103, two or more memories 103 may be mounted according to each layer in a protocol stack of the wireless communication system in the same manner as the processing circuit 102. For example, the memory 103 used for a process as a MAC entity included in the MAC layer, the memory 103 used for a process as an RLC entity included in the RLC layer, and the memory 103 used for a process as a PDCP entity included in the PDCP layer may be separately mounted.

The base station 20 illustrated in FIG. 17 includes a wireless communication circuit 201, a processing circuit 202, a memory 203, and a wired communication circuit 204. In the base station 20 illustrated in FIG. 17, an antenna is not illustrated.

In a downlink, the wireless communication circuit 201 is configured to receive a baseband signal from the processing circuit 202, generate a wireless signal with a predetermined output level by using the baseband signal, and radiate the wireless signal to the space via the antenna. In an uplink, the wireless communication circuit 201 is configured to receive a wireless signal input from the antenna, convert the wireless signal into a baseband signal, and supply the baseband signal to the processing circuit 202. The wireless communication circuit 201 may be coupled to the processing circuit 202 via a transmission path such as Common Public Radio Interface (CPRI), and may also be referred to as a remote radii head (RRH) or remote radio equipment (RRE). A combination of the wireless communication circuit 201 and the processing circuit 202 is not limited to a one-to-one basis, a plurality of processing circuits 202 may be correlated with a single wireless communication circuit 201, a plurality of wireless communication circuits 201 may be correlated with a single processing circuit 202, and a plurality of wireless communication circuits 201 may be correlated with a plurality of processing circuits 202. As described above, the wireless communication circuit 201 has an aspect of a communication unit (also referred to as a transmission/reception unit or a second transmission/reception unit) having a function of performing wireless communication with the terminal 10.

The processing circuit 202 is configured to perform baseband signal processing. In a downlink, the processing circuit 202 is configured to generate a baseband signal based on a protocol stack in a wireless communication system, and output the baseband signal to the wireless communication circuit 201. In an uplink, the processing circuit 202 is configured to perform a reception process such as demodulation or decoding on a baseband signal input from the wireless communication circuit 201 based on the protocol stack in the wireless communication system. For example, in a downlink, the processing circuit 202 has an aspect of a circuit that sequentially processes transmission data from an upper layer to a lower layer according to procedures of a protocol stack in which a wireless communication function is divided into a plurality of layers, and transmits the transmission data to the terminal apparatus 10 as a reception apparatus via the wireless communication circuit 201. In an uplink, the processing circuit 202 has an aspect of a circuit that sequentially processes a wireless signal received via the wireless communication circuit 201 from a lower layer to an upper layer, according to procedures of a protocol stack in which a wireless communication function is divided into a plurality of layers. In an uplink, receiving a baseband signal from the wireless communication circuit 201 has an aspect of receiving the wireless signal from the terminal 10 via the wireless communication circuit 201.

The processing circuit 202 may be, for example, a calculation device realizing an operation of the base station 20 according to each of the various Examples by reading and executing a program stored in the memory 203. Examples of the processing circuit 202 may include a central processing unit (CPU), a micro-processing unit (MPU), a digital signal processor (DSP), and a field-programmable gate array (FPGA). The processing circuit 202 may be a multicore processor including two or more cores. Regarding the processing circuit 202, two or more processing circuits 202 may be mounted according to each layer in a protocol stack of the wireless communication system. For example, the processing circuit 202 executing a process as a MAC entity included in the MAC layer, the processing circuit 202 executing a process as an RLC entity included in the RLC layer, and the processing circuit 202 executing a process as a PDCP entity included in the PDCP layer may be separately mounted. As described above, the processing circuit 202 has an aspect of a control unit (also referred to as a second control unit) having a function of controlling an operation of the base station 20.

The memory 203 is a circuit configured to store and hold data or a program related to baseband signal processing executed by the processing circuit 202. The memory 203 is configured to include at least one both or one of a nonvolatile storage device and a volatile storage device. For example, the memory may include a random-access memory (RAM), a read-only memory (ROM), a solid state drive (SSD), and a hard disk drive (HDD). In FIG. 17, the memory 203 is the generic name of various storage devices such as main storage devices and auxiliary storage devices. Regarding the memory 203, two or more memories 203 may be mounted according to each layer in a protocol stack of the wireless communication system in the same manner as the processing circuit 202. For example, the memory 203 used for a process as a MAC entity included in the MAC layer, the memory 203 used for a process as an RLC entity included in the RLC layer, and the memory 203 used for a process as a PDCP entity included in the PDCP layer may be separately mounted.

The wired communication circuit 204 performs conversion into packet data with a format that is suitable to be output to another apparatus and transmits the packet data to another apparatus, or extracts data from another apparatus and outputs the data to the memory 203 or the processing circuit 202. An example of another apparatus may be another base station aspect, a mobility management entity (MME), or a serving gateway (SGW). The MME or the SGW is also referred to as a core node, and a logical communication interface used for communication with the core node is also referred to as an S1 interface. A logical communication interface used for communication with another base station apparatus is also referred to as an X2 interface.

The feature points and the advantages of the embodiment will become apparent through the detailed description. This is intended to cover the features and advantages of the embodiment without departing from the spirit and the scope of the claims. Therefore, there is no intention to limit the scope of the inventive embodiments to the embodiment described above, and appropriate modifications and equivalents included in the scope disclosed in the embodiment may be used. For example, the respective steps disclosed in the present specification are not required to be processed in a time series according to the order described as an example of a flow of a process, and orders of steps may be replaced with each other within the scope of the concept of the present disclosure disclosed in the claims, or a plurality of steps may be executed in parallel. The situation that may occur in the fifth generation mobile communication system, clarified through the detailed description may be found when the fifth generation mobile communication system is examined from one aspect, and it is noted that other situations may be found when the fifth generation mobile communication system is examined from other aspects. For example, the feature points and the advantages of the present disclosure are not limited to an application for solving the situations described in the detailed description.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless terminal of a wireless communication system, the wireless communication system including a wireless base station and one or more wireless terminals, the wireless terminal comprising:
  a radio communication circuit configured to perform wireless communication with the wireless base station; and
  a controller configured to:
    allocate a part of an allocation amount of a wireless resource indicated in an uplink grant which is assigned according to a status report of a transmission buffer to transmission of an updated status report of the transmission buffer when the uplink grant is received from the wireless base station,
    transmit the updated status report and uplink data stored in the transmission buffer via the radio communication circuit, the updated status report being a status report according to a variation amount of uplink data stored in the transmission buffer after transmitting the updated status report, the variation amount reflecting an actual amount of uplink data currently stored in the transmission buffer after transmitting the updated status report, wherein the actual amount of uplink data currently stored in the transmission buffer reflects at least one of: an amount data added to the transmission buffer after transmitting the status report, an amount of data discarded from the transmission buffer after transmitting the status report, and a difference between an amount of transmission buffer data transmitted according to the uplink grant and an amount of transmission buffer data stored in the transmission buffer prior to transmitting the uplink data stored in the transmission buffer, taken alone or in any combination.

2. The wireless terminal according to claim 1, further comprising:
a memory configured to store a conversion table having a plurality of small ranges into which a range from a lower limit value of the transmission buffer to an upper limit value of the transmission buffer is divided, and indexes corresponding to the respective small ranges, wherein the controller is configured to:
specify the small range corresponding to an amount of data staying in the transmission buffer according to the conversion table,
acquire the index corresponding to the specified small range, and
store the index into the status report of the transmission buffer.

3. The wireless terminal according to claim 1, wherein the controller is configured to:
allocate a part of the allocation amount of the wireless resource indicated in the uplink grant to transmission of the status report of the transmission buffer in a case where a status of the transmission buffer satisfies a predetermined condition, and
not allocate a part of the allocation amount of the wireless resource indicated in the uplink grant to transmission of the status report of the transmission buffer in a case where a status of the transmission buffer does not satisfy the predetermined condition.

4. The wireless terminal according to claim 3, wherein the controller is configured to receive the predetermined condition from the wireless base station via using the radio communication circuit.

5. A wireless base station of a wireless communication system, the wireless communication system including a wireless base station and one or more wireless terminals, the wireless base station comprising:
a radio communication circuit configured to perform wireless communication with at least one wireless terminal; and
a controller configured to transmit, to the at least one wireless terminal via the radio communication circuit, an uplink grant indicating an allocation amount of a wireless resource allocated to the at least one wireless terminal, the uplink grant being assigned according to a status report of a transmission buffer of the at least one wireless terminal,
wherein the controller is configured to:
transmit the uplink grant to the at least one wireless terminal, and
receive an updated status report of the transmission buffer of the at least one wireless terminal via the radio communication circuit, the updated status report transmitted from the at least one wireless terminal using a part of the allocation amount of the wireless resource, the updated status report being a status report according to a variation amount of uplink data stored in the transmission buffer of the at least one wireless terminal after the at least one wireless terminal transmits the updated status report, the variation amount reflecting an actual amount of uplink data currently stored in the transmission buffer after the at least one wireless terminal transmits the updated status report, wherein the actual amount of uplink data currently stored in the transmission buffer reflects at least one of: an amount data added to the transmission buffer after transmitting the status report, an amount of data discarded from the transmission buffer after transmitting the status report, and a difference between an amount of transmission buffer data transmitted according to the uplink grant and an amount of transmission buffer data stored in the transmission buffer prior to transmitting the uplink data stored in the transmission buffer, taken alone or in any combination.

6. A wireless communication system comprising:
a wireless base station; and
at least one wireless terminal,
wherein the at least one wireless terminal includes:
a first radio communication circuit configured to perform wireless communication with the wireless base station, and
a first controller configured to:
allocate a part of an allocation amount of a wireless resource indicated in an uplink grant which is assigned according to a status report of a transmission buffer to transmission of an updated status report of the transmission buffer when the uplink grant is received from the wireless base station, and
transmit the updated status report and uplink data stored in the transmission buffer via the radio communication circuit, the updated status report being a status report according to a variation amount of uplink data stored in the transmission buffer after transmitting the updated status report, the variation amount reflecting an actual amount of uplink data currently stored in the transmission buffer after transmitting the updated status report, wherein the actual amount of uplink data currently stored in the transmission buffer reflects at least one of: an amount data added to the transmission buffer after transmitting the status report, an amount of data discarded from the transmission buffer after transmitting the status report, and a difference between an amount of transmission buffer data transmitted according to the uplink grant and an amount of transmission buffer data stored in the transmission buffer prior to transmitting the uplink data stored in the transmission buffer, taken alone or in any combination, and
wherein the wireless base station includes:
a second radio communication circuit configured to perform wireless communication with the at least one wireless terminal, and
a second controller configured to:
transmit the uplink grant indicating an allocation amount of a wireless resource allocated to the at least one wireless terminal through scheduling of the wireless resource,
acquire the updated status report of the transmission buffer from an uplink signal received from the at least one wireless terminal in response to transmission of the uplink grant, and
acquire a buffer estimation amount of the at least one wireless terminal based on the acquired updated status report.

7. The wireless communication system according to claim 6,
wherein the at least one wireless terminal further includes a memory configured to store a conversion table having a plurality of small ranges into which a range from a lower limit value of the transmission buffer to an upper limit value of the transmission buffer is divided, and indexes corresponding to the respective small ranges,
wherein the first controller included in the at least one wireless terminal is configured to:
specify the small range corresponding to an amount of data staying in the transmission buffer according to the conversion table,
acquire the index corresponding to the specified small range, and
store the index in the updated status report.

8. The wireless communication system according to claim 6,
wherein the first controller included in the at least one wireless terminal is configured to:
allocate a part of the allocation amount of the wireless resource indicated in the uplink grant to transmission of the status report of the transmission buffer in a case where a status of the transmission buffer satisfies a predetermined condition, and
not allocate a part of the allocation amount of the wireless resource indicated in the uplink grant to transmission of the status report of the transmission buffer in a case where a status of the transmission buffer does not satisfy the predetermined condition.

9. The wireless communication system according to claim 8,
wherein the second controller included in the wireless base station is configured to transmit the predetermined condition to the at least one wireless terminal via the second radio communication circuit, and
wherein the first controller included in the at least one wireless terminal is configured to receive the predetermined condition from the wireless base station via the first radio communication circuit.

10. A wireless communication method implemented by a wireless terminal of a wireless communication system, the wireless communication system including a wireless base station and one or more wireless terminals, the wireless communication method comprising:
receiving an uplink grant which is assigned according to a status report of a transmission buffer from the wireless base station; and
allocating a part of an allocation amount of a wireless resource indicated in the uplink grant to transmission of an updated status report of the transmission buffer when uplink data stored in the transmission buffer is transmitted according to the uplink grant, the updated status report being a status report according to a variation amount of uplink data stored in the transmission buffer after transmitting the updated status report, the variation amount reflecting an actual amount of uplink data currently stored in the transmission buffer after transmitting the updated status report, wherein the actual amount of uplink data currently stored in the transmission buffer reflects at least one of: an amount data added to the transmission buffer after transmitting the status report, an amount of data discarded from the transmission buffer after transmitting the status report, and a difference between an amount of transmission buffer data transmitted according to the uplink grant and an amount of transmission buffer data stored in the transmission buffer prior to transmitting the uplink data stored in the transmission buffer, taken alone or in any combination.

11. The wireless communication method according to claim 10, further comprising:
specifying a small range corresponding to an amount of data staying in the transmission buffer according to a conversion table having a plurality of small ranges into which a range from a lower limit value of the transmission buffer to an upper limit value of the transmission buffer is divided, and indexes corresponding to the respective small ranges;
acquiring the index corresponding to the specified small range according to the conversion table; and
storing the index into the status report of the transmission buffer.

12. The wireless communication method according to claim 10, wherein the allocating is configured to:
allocate a part of the allocation amount of the wireless resource indicated in the uplink grant to transmission of the status report of the transmission buffer in a case where a status of the transmission buffer satisfies a predetermined condition, and
not allocate a part of the allocation amount of the wireless resource indicated in the uplink grant to transmission of the status report of the transmission buffer in a case where a status of the transmission buffer does not satisfy the predetermined condition.

13. The wireless communication method according to claim 12, wherein the allocating includes receiving the predetermined condition from the wireless base station.

* * * * *